(12) United States Patent
Hyun

(10) Patent No.: US 10,048,828 B2
(45) Date of Patent: Aug. 14, 2018

(54) METHOD OF INTERFACE CONTROL AND ELECTRONIC DEVICE THEREOF

(71) Applicant: Samsung Electronics Co., Ltd., Gyeonggi-do (KR)

(72) Inventor: Ju-Ho Hyun, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 441 days.

(21) Appl. No.: 14/565,253

(22) Filed: Dec. 9, 2014

(65) Prior Publication Data

US 2015/0160827 A1   Jun. 11, 2015

(30) Foreign Application Priority Data

Dec. 9, 2013 (KR) .......................... 10-2013-0152470

(51) Int. Cl.
*G06F 3/0481*   (2013.01)
*G06F 3/0482*   (2013.01)
*G06F 3/0488*   (2013.01)

(52) U.S. Cl.
CPC ........ *G06F 3/04817* (2013.01); *G06F 3/0482* (2013.01); *G06F 3/0488* (2013.01)

(58) Field of Classification Search
CPC ............................ G06F 3/04817; G06F 3/0482
See application file for complete search history.

(56) References Cited

U.S. PATENT DOCUMENTS

| | | | |
|---|---|---|---|
| 6,771,290 B1* | 8/2004 | Hoyle | G06F 8/60 715/745 |
| 9,594,471 B1* | 3/2017 | Callan | G06F 3/04817 |
| 2002/0000998 A1* | 1/2002 | Scott | G06F 17/30274 345/667 |
| 2005/0044508 A1* | 2/2005 | Stockton | G06F 9/451 715/811 |
| 2006/0095864 A1* | 5/2006 | Mock | G06F 1/3203 715/810 |
| 2007/0016877 A1* | 1/2007 | Shirakawa | H04N 5/44508 715/810 |
| 2007/0067757 A1* | 3/2007 | Amemiya | H04L 41/12 717/136 |
| 2007/0240077 A1* | 10/2007 | McCarthy | G06F 3/04817 715/802 |

(Continued)

FOREIGN PATENT DOCUMENTS

| | | |
|---|---|---|
| JP | H11110182 | 4/1999 |
| KR | 10-2008-0077798 | 8/2008 |
| KR | 10-2011-0091083 | 8/2011 |

*Primary Examiner* — William Bashore
*Assistant Examiner* — Nathan Shrewsbury

(57) ABSTRACT

A method and an apparatus for configuring a user interface in an electronic device are provided. The method for configuring the user interface in the electronic device includes determining whether application execution information satisfies a predefined condition. The method for configuring the user interface in the electronic device includes determining an icon corresponding to the condition among a plurality of icons. The method for configuring the user interface in the electronic device includes displaying the determined icon. The application execution information includes at least one of an execution count, an execution time, and an execution point of the application during a reference time.

12 Claims, 24 Drawing Sheets

(56) References Cited

U.S. PATENT DOCUMENTS

| | | | |
|---|---|---|---|
| 2011/0258581 A1* | 10/2011 | Hu | G06F 3/04817 715/811 |
| 2012/0210265 A1* | 8/2012 | Delia | G06F 8/34 715/771 |
| 2013/0014040 A1* | 1/2013 | Jagannathan | G06Q 50/01 715/765 |
| 2013/0042188 A1 | 2/2013 | Dobronsky | |
| 2013/0145296 A1* | 6/2013 | Stecher | G06F 3/0482 715/765 |
| 2013/0152017 A1* | 6/2013 | Song | G06F 9/4443 715/811 |

* cited by examiner

METHOD OF INTERFACE CONTROL AND ELECTRONIC DEVICE THEREOF

CROSS-REFERENCE TO RELATED APPLICATION(S) AND CLAIM OF PRIORITY

The present application is related to and claims the priority under 35 U.S.C. § 119(a) to a Korean Patent Application filed in the Korean Intellectual Property Office on Dec. 9, 2013, and assigned Serial No. 10-2013-0152470, the contents of which are herein incorporated by reference.

TECHNICAL FIELD

The present disclosure relates to a method of interface control and an electronic device thereof.

BACKGROUND

With advances in information communication technology and semiconductor technology, various electronic devices are advancing to multimedia devices for providing various multimedia services. For example, a portable electronic device provides various multimedia services such as broadcasting service, wireless Internet service, camera service, and music play service. Such services can be provided using an application installed in the electronic device, and the application can be executed by selecting an icon displayed in a user interface. Electronic device users can personally configure the user interface by placing the icon for his/her intention or deleting the application used infrequently.

SUMMARY

To address the above-discussed deficiencies of the prior art, it is a primary object of the present disclosure to provide a method and an apparatus for determining an icon image of an application according to application execution information.

Another aspect of the present disclosure is to provide a method and an apparatus for determining an icon image of an application according to an application execution count.

Yet another aspect of the present disclosure is to provide method and an apparatus for determining an icon image of an application according to an application execution point.

Still another aspect of the present disclosure is to provide method and an apparatus for determining an icon image of an application according to an application execution time.

A further aspect of the present disclosure is to provide method and an apparatus for determining an icon location of an application according to application execution information.

A further aspect of the present disclosure is to provide a method and an apparatus for determining an icon location of an application according to an application execution count.

A further aspect of the present disclosure is to provide a method and an apparatus for determining an icon location of an application according to an application execution point.

A further aspect of the present disclosure is to provide a method and an apparatus for determining an icon location of an application according to an application execution time.

A further aspect of the present disclosure is to provide method and an apparatus for determining an area of an application icon image according to application execution information.

A further aspect of the present disclosure is to provide a method and an apparatus for determining an area of an application icon image according to application execution count.

A further aspect of the present disclosure is to provide a method and an apparatus for determining an area of an application icon image according to an application execution point.

A further aspect of the present disclosure is to provide a method and an apparatus for determining an area of an application icon image according to an application execution time.

A further aspect of the present disclosure is to provide method and an apparatus for determining to delete an application according to application execution information.

A further aspect of the present disclosure is to provide a method and an apparatus for determining to delete an application according to an application execution count.

A further aspect of the present disclosure is to provide a method and an apparatus for determining to delete an application according to an application execution point.

A further aspect of the present disclosure is to provide a method and an apparatus for determining to delete an application according to an application execution time.

In a first example, a method for configuring a user interface in an electronic device is provided. The method includes determining whether application execution information satisfies a predefined condition. The method also includes determining an icon corresponding to the condition among a plurality of icons. The method further includes displaying the determined icon. The application execution information includes at least one of an execution count, an execution time, and an execution point of the application during a reference time.

The plurality of the icons includes at least one different characteristic of a color, a brightness, a saturation, an area, and a shape.

The displaying of the icon includes displaying the icon using a storage path of the icon stored in a memory of the electronic device.

The displaying of the icon includes displaying the icon using a Uniform Resource Locator (URL) of the icon stored in a server accessible by the electronic device.

The method further includes determining a location to arrange the icon by considering the application execution information.

The method further includes determining whether to delete the icon by considering the application execution information.

The method further includes determining whether to delete the icon by considering whether the application is preloaded or paid.

The method further includes placing at least one icon in a particular folder by considering the application execution information.

In a second example, an electronic device is provided. The electronic device includes one or more memories. The electronic device also includes one or more displays. The electronic device further includes one or more processors. The one or more processors are configured to determine whether application execution information satisfies a predefined condition. The one or more processors are also configured to determine an icon corresponding to the condition among a plurality of icons. The one or more processors are further configured to display the determined icon on the display. The application execution information includes at least one of an execution count, an execution time, and an execution point of the application during a reference time.

The plurality of the icons includes at least one different characteristic of a color, a brightness, a saturation, an area, and a shape.

The processor controls to display the icon on the display using a storage path of the icon stored in a memory.

The processor controls to display the icon on the display using a Uniform Resource Locator (URL) of the icon stored in a server accessible by the electronic device.

The processor determines a location to arrange the icon by considering the application execution information.

The processor determines whether to delete the icon by considering the application execution information.

The processor determines whether to delete the icon by considering whether the application is preloaded or paid.

The processor places at least one icon in a particular folder by considering the application execution information.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
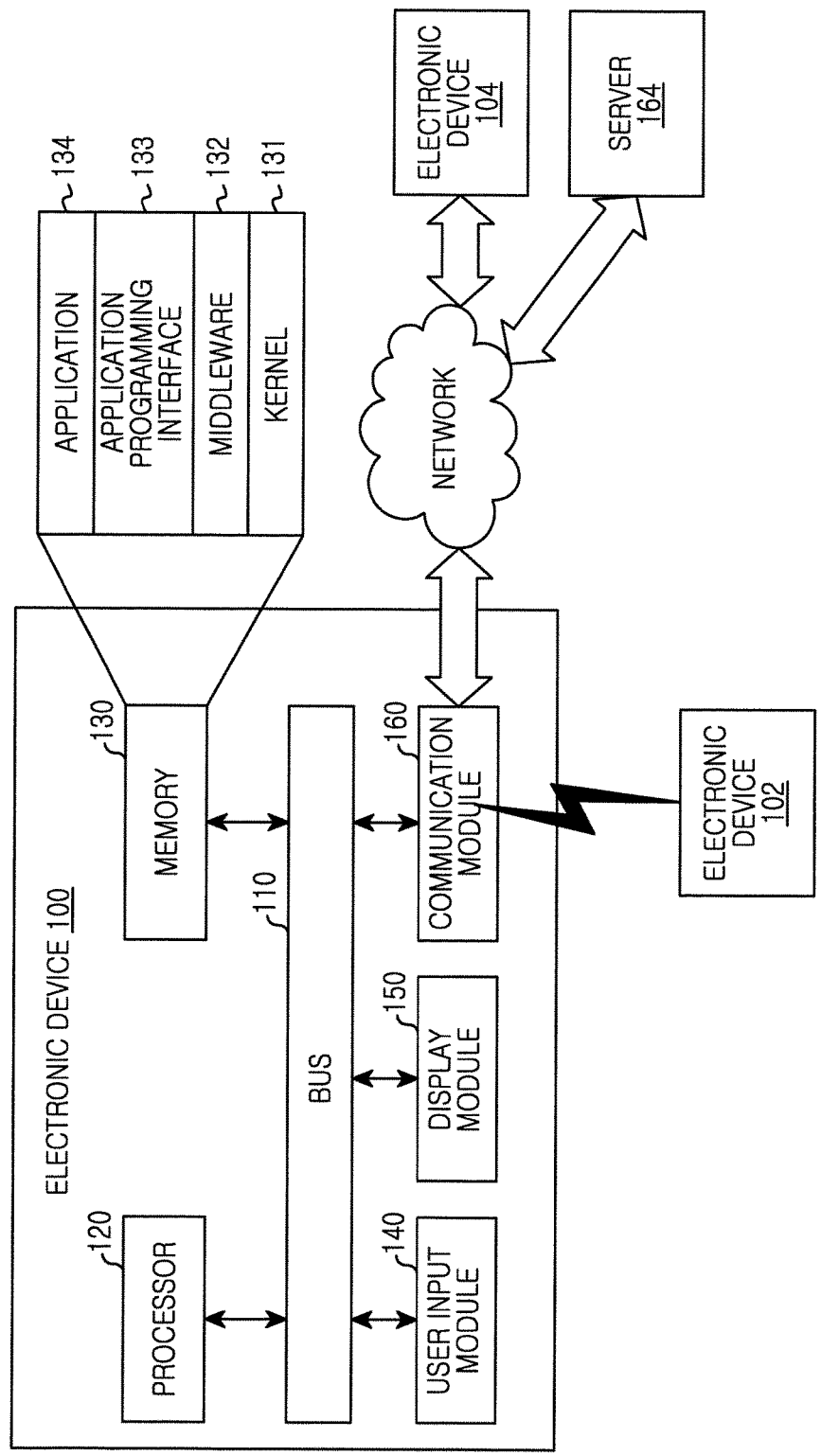
FIG. 1 is a block diagram of an example electronic device according to this disclosure.

FIGS. 1 through 11D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to the present disclosure includes one or more combinations of various devices including a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical appliance, an electronic bracelet, an electronic necklace, an electronic appsessory, a camera, a wearable device, an electronic clock, a wrist watch, a smart white appliance (such as refrigerator, air conditioner, vacuum cleaner, artificial intelligence robot, television (TV), digital versatile disc (DVD) player, audio system, oven, microwave oven, washing machine, air purifier, and digital frame), medical appliances (such as Magnetic resonance angiography (MRA), magnetic resonance imaging (MRI), computed tomography (CT), X-ray, and ultrasonicator)), a navigation device, a global positioning system (GPS) receiver, an event data recorder (EDR), a flight data recorder (FDR), a set-top box, a TV box (such as Samsung HomeSync™, AppleTV™, and Google TV™), an electronic dictionary, a in-vehicle infotainment, electronic equipment for ship (such as marine navigation device, gyro compass), avionics, a security device, an e-textile, a digital key, a camcorder, a game console, a head mounted display (HMD), a flat panel display device, an electronic album, part of furniture or building/structure having the communication function, an electronic board, an electronic sign input device, and a projector. Those skilled in the art shall understand that the electronic device of the present disclosure is not limited those devices.

FIG. 1 is a block diagram of an example electronic device according to this disclosure.

Referring to FIG. 1, the electronic device 100 includes a bus 110, a processor 120, a memory 130, a user input module 140, a display module 150, and a communication module 160.

The bus 110 is a circuit for interlinking the components (such as the bus 110, the processor 120, the memory 130, the user input module 140, the display module 150, and the communication module 160) of the electronic device 100 and transferring communication (such as control messages) between the components.

The processor 120 receives an instruction from the components of the electronic device 100 via the bus 110, interpret the received instruction, and perform an operation or a data processing according to the interpreted instruction.

The memory 130 stores the instruction or the data received from or generated by the processor 120 or the other components (such as the user input module 140, the display module 150, and the communication module 160). For example, the memory 130 stores at least one image. The image is used as an icon image of an application. For example, the memory 130 stores an execution count, an execution point, and an execution time of the application. For example, the memory 130 stores a Uniform Resource Locator (URL) of the at least one image stored in a server 164.

The memory 130 includes at least one programming module including a kernel 131, middleware 132, an application programming interface (API) 133, or an application 134. The programming modules are implemented using software, firmware, and hardware, or a combination of at least two of them.

The kernel 131 controls or manages system resources (such as the bus 110 and the processor 120) or the memory 130 used to execute the operation or the function of the other programming modules (such as the middleware 132, the API 133, and the application 134). The kernel 131 provides an interface allowing the middleware 132, the API 133, or the application 134 to access and control or manages the individual component of the electronic device 100.

The middleware 132 relays data in communication between the API 133 or the application 134 and the kernel 131. The middleware 132 performs load balancing for a work request received from the at least one application 134 by giving priority of the system resource (such as the bus 110, the processor 120, or the memory 130) of the electronic device 100.

The API 133, which is an interface for the application 134 to control the kernel 131 or the middleware 132, includes at least one interface or function for file control, window control, image processing, or text control.

The user input module 140 receives and forwards the instruction or the data from the user to the processor 120 or the memory 130 via the bus 110.

The display module 150 displays an image, a video, or data to the user.

The communication module 160 connects the communication between the electronic device 100 and other electronic devices 102. The communication module 160 support short-range communication protocol (such as wireless fidelity (Wi-Fi), bluetooth (BT), near field communication (NFC)), or network communication (such as interne, local area network (LAN), wide area network (WAN), telecommunication network, cellular network, satellite network, or plain old telephone service (POTS)).

The other electronic devices 102 and 104 is the same as or different from the electronic device 100 in type.

Figure 2:
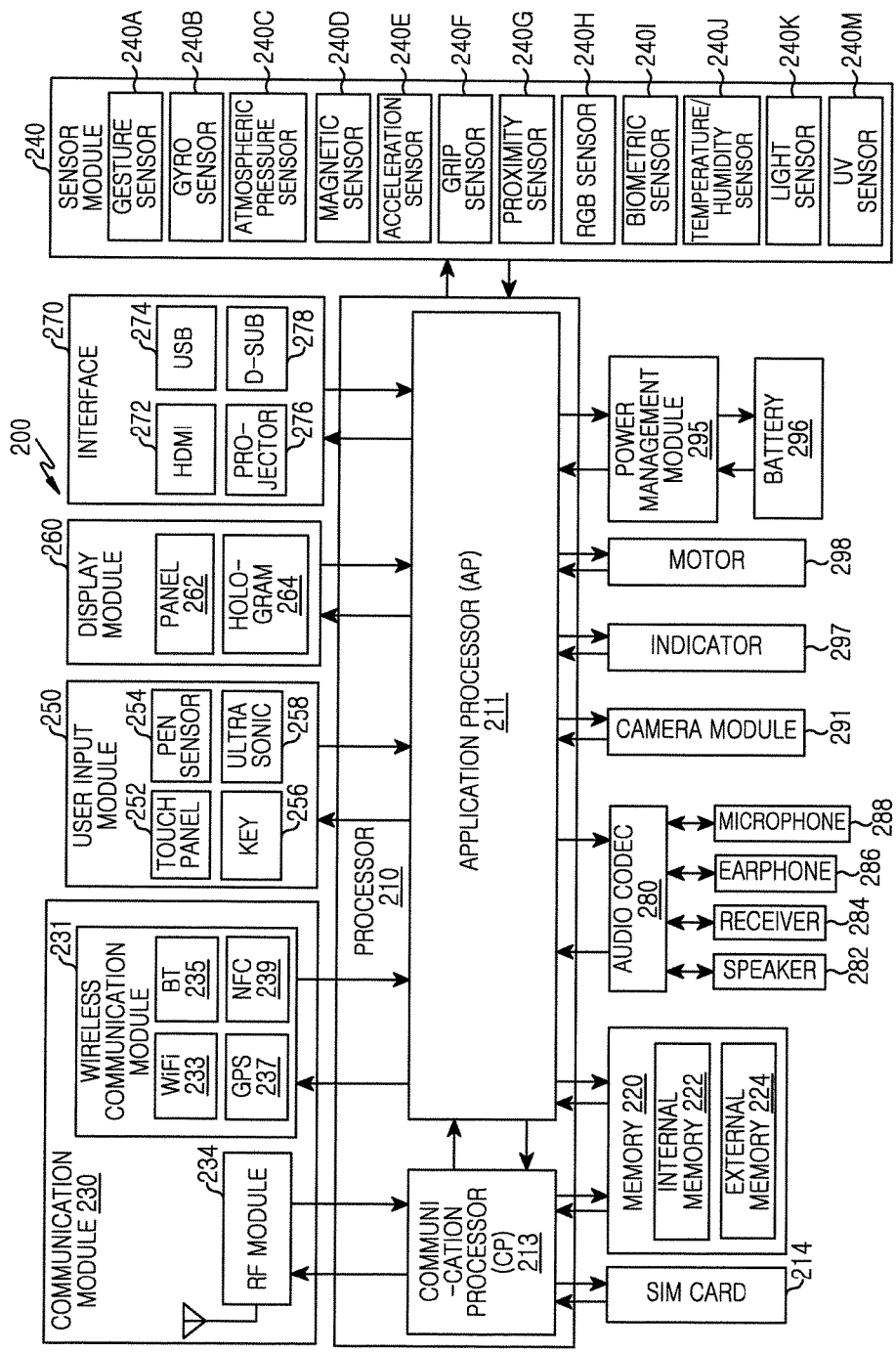
FIG. 2 is a block diagram of example hardware according to this disclosure.

FIG. 2 is a block diagram of example hardware according to this disclosure.

Referring to FIG. 2, the hardware 200 includes one or more processors 210, a subscriber identity module (SIM) card 214, a memory 220, a communication module 230, a sensor module 240, a user input module 250, a display module 260, an interface 270, an audio codec 280, a camera module 291, a power management module 295, a battery 296, an indicator 297, and a motor 298. Herein, the hardware 200 is the electronic device 100 of FIG. 1.

The processor 210 includes one or more application processor (APs) 211 and one or more communication processors (CPs) 213. Herein, the processor 210 is the processor 120 of FIG. 1.

While the AP 211 and the CP 213 are included in the processor 210 of FIG. 2, the AP 211 and the CP 213 is included in different integrated circuit (IC) packages. The AP 211 and the CP 213 is included in a single IC package. Additionally, the processor 210 further includes a graphics processing unit (GPU).

The AP 211 controls hardware or software components connected to the AP 211 by driving an operating system or an application program, and carry out data processing and operations including multimedia data. Herein, the AP 211 is implemented using a system on chip (SoC).

The CP 213 manages data links and converts the communication protocol in the communication between the electronic device (such as the electronic device 100) including the electronic device including the hardware 200 and the other electronic devices connected over the network. Herein, the CP 213 is implemented using a SoC.

The CP 213 performs at least part of the multimedia control function.

The CP 213 identifies and authenticates a terminal in the communication network using the SIM card 214. In so doing, the CP 213 provides the user with a service including voice telephony, video telephony, text message, and packet data.

The CP 213 controls the data transmission and reception of the communication module 230.

While the components of the CP 213, the power management module 295, and the memory 220 are separated from the AP 211 in FIG. 2, the AP 211 includes part (such as the CP 213) of those components.

The AP 211 or the CP 213 loads and processes the instruction or the data received from its non-volatile memory or at least one of the other components, in a volatile memory. The AP 211 or the CP 213 stores data received from or generated by at least one of the other components, in the non-volatile memory.

The SIM card 214 is inserted to a slot formed at a specific location of the electronic device. The SIM card 214 contains unique identification information (such as integrated circuit card identifier (ICCID)) or subscriber information (such as international mobile subscriber identity (IMSI)).

The memory 220 includes an internal memory 222 and an external memory 224. Herein, the memory 220 is the memory 130 of FIG. 1.

The internal memory 222 includes at least one of the volatile memory (such as dynamic random access memory (DRAM), static RAM (SRAM), and synchronous DRAM (SDRAM)) and the non-volatile memory (such as one-time programmable read only memory (OTPROM), PROM, erasable PROM (EPROM), electrically EPROM (EEPROM), mask ROM, flash ROM, NAND flash memory, and NOR flash memory). The internal memory 222 employs a solid state Drive (SSD).

The external memory 224 includes at least one of a compact flash (CF), a secure digital (SD), a micro-SD, a mini-SD, an extreme digital (xD), and a memory stick.

The communication module 230 includes a wireless communication module 231 and a radio frequency (RF) module 234. Herein, the communication module 230 is the communication module 160 of FIG. 1.

The wireless communication module 231 provides a radio communication function using a radio frequency. For example, the wireless communication module 231 includes a Wi-Fi 233, a BT 235, a GPS 237, and an NFC 239. For example, the wireless communication module 231 includes a network interface (such as LAN card) or a modem for connecting the hardware 200 to the network (such as Internet, LAN, WAN, telecommunication network, cellular network, satellite network, or POTS).

The RF module 234 transmits and receives the data including an RF signal or a paged electric signal. For example, the RF module 234 includes a transceiver, a pulse amplitude modulation (PAM), a frequency filter, or a low noise amplifier (LNA). The RF module 234 further includes a component (such as conductor or conducting wire) for sending and receiving electromagnetic waves in free space in the wireless communication.

The sensor module 240 includes at least one of a gesture sensor 240A, a gyro sensor 240B, an atmospheric pressure sensor 240C, a magnetic sensor 240D, an acceleration sensor 240E, a grip sensor 240F, a proximity sensor 240G, a red green blue (RGB) sensor 240H, a biometric sensor 2401, a temperature/humidity sensor 240J, a light sensor 240K, and an ultraviolet (UV) sensor 240M. The sensor module 240 measures a physical quantity or detects the operation status of the electronic device, and converts the measured or detected information to an electric signal. Additionally/substantially, the sensor module 240 includes an E-noise sensor, an electromyography (EMG) sensor, an electroencephalogram (EEG) sensor, an electrocardiogram (ECG) sensor, or a finger print sensor. The sensor module 240 further includes a control circuit for controlling its one or more sensors.

The user input module 250 includes a touch panel 252, a pen sensor 254, a key 256, and an ultrasonic input device 258. Herein, the user input module 250 is the user input module 140 of FIG. 1.

The touch panel 252 recognizes the touch input using at least one of capacitive, resistive, infrared, and surface acoustic wave (SAW) techniques. The touch panel 252 further includes a controller. The capacitive touch panel recognizes not only the direct touch but also the proximity. The touch panel 252 further includes a tactile layer. In this case, the touch panel 252 provides a tactile response to the user.

The pen sensor 254 is implemented using the same or similar method as or to the user's touch input, or using a separate recognition sheet.

The key 256 includes a keypad or a touch key.

The ultrasonic input device 258 obtains data by detecting microwave through a microphone 288 in the electronic device through the pen which generates an ultrasonic signal, and allows radio frequency identification.

The hardware 200 receives the user input from an external device (such as a network 102, a computer, or a server 164) connected using the communication module 230.

The display module 260 includes a panel 262 or a hologram 264. Herein, the display module 260 is the display module 150 of FIG. 1.

The panel 262 employs a liquid crystal display (LCD) or an active matrix organic light emitting diode (AMOLED). The panel 262 is implemented flexibly, transparently, or wearably. Herein, the panel 262 is constructed as a single module with the touch panel 252.

The hologram 264 presents a three-dimensional image in the air using interference of light.

The display module 260 further includes a control circuit for controlling the panel 262 or the hologram 264.

The interface 270 includes a high definition multimedia interface (HDMI) 272, a universal serial bus (USB) 274, a projector 276, a D-sub 278, a SD/Multi-Media Card (MMC), and IrDA.

The audio codec 280 converts the voice to an electric signal and vice versa. For example, the audio codec 280 converts voice information which is input or output through a speaker 282, a receiver 284, an earphone 286, or the microphone 288.

The camera module 291 captures a still picture and a moving picture. For example, the camera module 291 includes one or more image sensors (such as front lens or rear lens), an image signal processor (ISP), or a flash LED.

The power management module 295 manages power of the hardware 200. For example, the power management module 295 includes a power management IC (PMIC), a charging IC, or a battery gauge. Herein, the PMIC is mounted in an IC or a SoC semiconductor.

The charging type of the power management module 295 is divided to a wired type and a wireless type.

The charging IC charges the battery and prevents overvoltage or overcurrent from flowing from a charger. The charging IC includes a charging IC for at least one of the wired charging type or the wireless charging type. The wireless charging type includes magnetic resonance, magnetic induction, and microwave, and further includes an additional circuit (such as a coil loop, a resonance circuit, and a rectifier circuit) for the wireless charging.

The battery gauge measures the remaining capacity of the battery 296 and the voltage, the current, or the temperature of the charging.

The battery 296 supplies the power by generating the electricity. For example, the battery 296 is a rechargeable battery.

The indicator 297 displays a specific status (such as booting state, message state, or charging state) of the hardware 200 or part (such as AP 211) of the hardware 200.

The motor 298 converts the electric signal to a mechanic vibration.

An MCU controls the sensor module 240.

Additionally, the hardware 200 further includes a processor (such as GPU) for supporting mobile TV. For example, the processor for supporting the mobile TV processes media data in conformity with digital multimedia broadcasting (DMB), digital video broadcasting (DVB), or media flow standard.

The names of the hardware components of the present disclosure vary according to the type of the electronic device. The hardware of the present disclosure includes at least one of the components, omit some components, or further include other components. Some of the hardware components are united to the single entity to carry out the same functions of the corresponding components.

Figure 3:
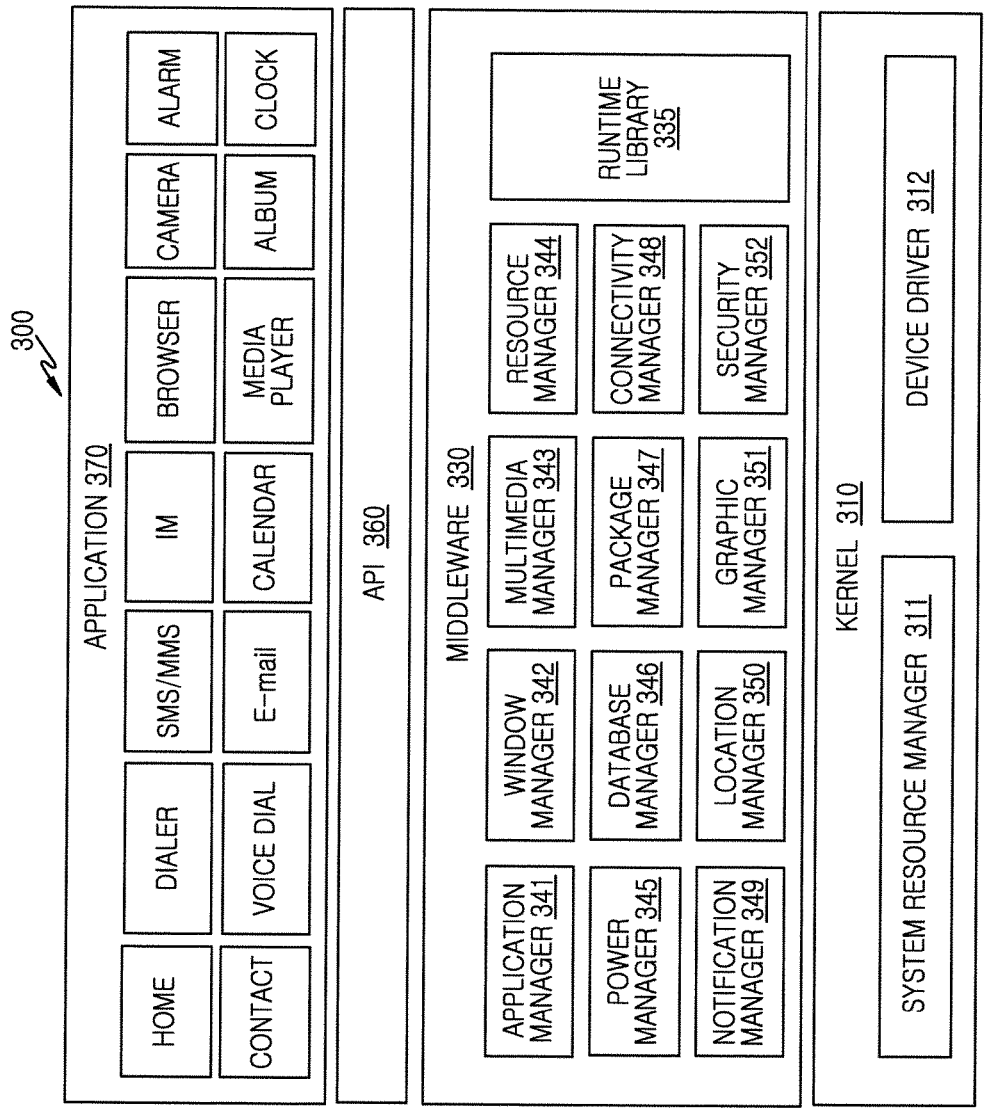
FIG. 3 is a block diagram of an example programming module according to this disclosure.

FIG. 3 is a block diagram of an example programming module according to this disclosure.

Referring to FIG. 3, the programming module 300 includes a kernel 310, a middleware 330, an API 360, and an application 370. Herein, the programming module 300 is included (such as stored) in the electronic device 100 (such as the memory 130) of FIG. 1. At least part of the programming module 300 includes software, firmware, hardware, or a combination of at least two of them. The programming module 300 includes an operating system (OS) for controlling resources of the electronic device 100 in the hardware 200, and various applications 370 running on the OS. For example, the OS includes Android, iOS, Windows, Symbian, Tizen, and Bada.

The kernel 310 includes a system resource manager 311 and a device driver 312. Herein, the kernel 310 is the kernel 131 of FIG. 1.

The system resource manager 311 controls, allocates, or reclaims the system resource. For example, the system resource manager 311 includes a process manager, a memory manager, and a file system manager.

The device driver 312 includes a display driver, a camera driver, a BT driver, a shared memory driver, a USB driver, a keypad driver, a Wi-Fi driver, an audio driver, and an inter-process communication (IPC) driver.

The middleware 330 includes a plurality of preset modules for providing the common function required by the application 370. Herein, the middleware 330 is the middleware 132 of FIG. 1. The middleware 330 allows the application 370 to efficiently use the limited system resources of the electronic device through the API 360. For example, the middleware 330 includes at least one of a runtime library 335, an application manager 341, a window manager 342, a multimedia manager 343, a resource manager 344, a power manager 345, a database manager 346, a package manage 347, a connectivity manager 348, a notification manager 349, a location manager 350, a graphic manager 351, and a security manager 352.

The runtime library 335 includes a library module used by a compiler to add a new function using a programming language while the application 370 is running. For example, the runtime library 335 processes input/output, memory management, and arithmetic function.

The application manager 341 manages a life cycle of at least one of the applications 370.

The window manager 342 manages GUI resources used in the screen.

The multimedia manage 343 identifies a format required to play various media files, and encodes or decodes the media file using a codec suitable for the corresponding format.

The resource manager 344 manages source code, memory, storage space of at least one of the applications 370.

The power manager 345 manages the battery or the power in association with BIOS, and provides power information for the operation.

The database manager 346 manages to generate, retrieve, or change a database to be used by at least one of the applications 370. For example, the database manager 346 manages harmful site information (URL or IP) stored in the memory 130.

The package manager 347 manages installation or updating of the application distributed as a packet file.

The connectivity manager 348 manages the wireless connection of the Wi-Fi or the BT.

The notification manager 349 displays or notifies an event of an incoming message, an appointment, and proximity to the user without interruption.

The location manager 350 manages location information of the electronic device.

The graphic manager 351 manages graphical effect for the user or its related user interface.

The security manager 352 provides a security function for the system security or the user authentication.

When the electronic device 100 includes a call function, the middleware 330 further includes a call manager for managing the voice or video call function of the electronic device.

The middleware 330 generates and uses a new middleware module by combining various functions of the internal component modules. To provide a differentiated function, the middleware 330 provides a specialized module per OS. The middleware 330 dynamically removes some components or adds new components. Hence, the exemplary embodiments of the present disclosure can omit some of the components, include other components, or replace with other components of similar functions.

The API 360, which is a set of API programming functions, differs according to the OS. Herein, the API 360 is the API 133 of FIG. 1. For example, in Android and iOS, one API set is provided per platform. In Tizen, one or more API sets is provided.

The application 370 includes a preload application or a third party application. Herein, the application 370 is the application 134 of FIG. 1.

At least part of the programming module 300 is implemented using an instruction stored in computer-readable storage media. When the one or more processors 210 execute the instruction, it or they performs the function corresponding to the instruction. The computer-readable storage medium is the memory 260. Part of the programming module 300 is realized (such as executed) by the processors 210. Part of the programming module 300 includes a module, a program, a routine, an instruction set, or a process for one or more functions.

Additionally, the electronic device further includes an icon image determination module and a layout determination module. For example, the icon image determination module determines the icon image of each application by considering the application execution count, the execution point, and the execution time alone or in combination, stored in the memory 130. For example, the icon image determination module determines the image stored in the memory 130 or the server 164, as the application icon image. For example, the icon image determination module determines a color, a brighstness, a saturation, an area, a shape, or their combination, of the icon image. For example, the layout determination module arranges applications by considering the execution count, the execution point, the execution time, or their combination of the application stored in the memory 130. For example, the layout determination module determine whether to delete the application by considering the execution count, the execution point, the execution time, or their combination of the application stored in the memory 130.

The names of the components of the programming module 300 differ according to the type of the OS. The programming module can include at least one of the components, can omit some components, or can further include other components.

Figure 4:
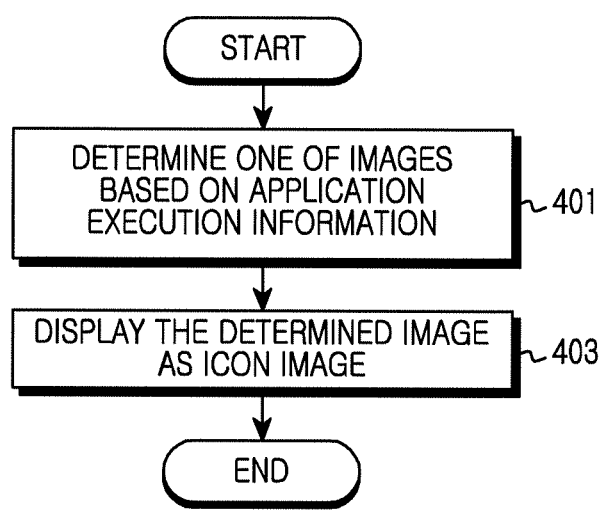
FIG. 4 is an example flowchart for determining an icon image based on application execution information in the electronic device according to this disclosure.

FIG. 4 is an example flowchart for determining the icon image based on the application execution information in the electronic device according to this disclosure.

Referring to FIG. 4, the electronic device determines one of images based on the application execution information in step 401. In so doing, the electronic device considers the execution information during a reference period. For example, the electronic device determines at least one image corresponding to the application execution count (frequency). For example, the electronic device determines at least one image corresponding to the application execution point. For example, the electronic device determines at least one image corresponding to the application execution time. In so doing, the image is stored in the memory 130 or the server 164.

In step 403, the electronic device displays the determined image as the icon image. As shown in FIGS. 8A through 8E, the electronic device displays the image determined based on the application execution count, the execution point, the execution time, or their combination, as the icon image.

Figure 5A:
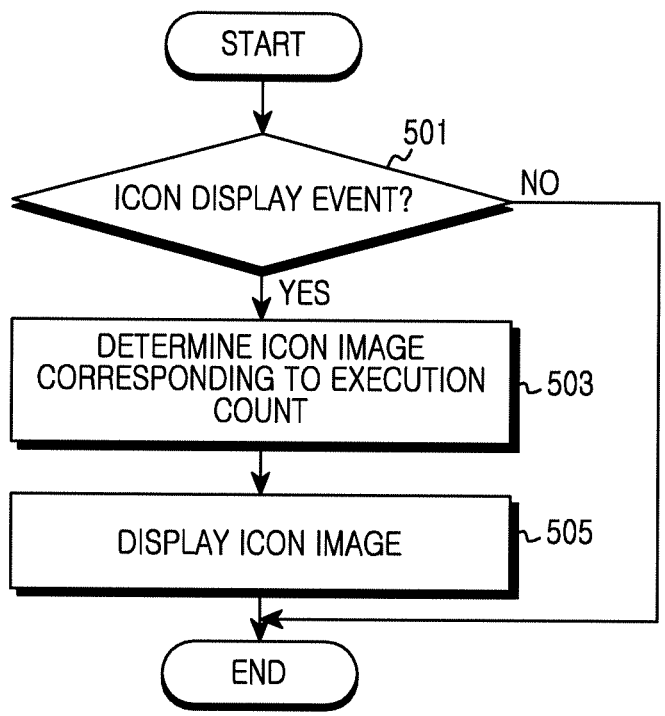
FIGS. 5A and 5B are example flowcharts for determining the icon image based on an application execution count in the electronic device according to this disclosure.
Figure 5B:
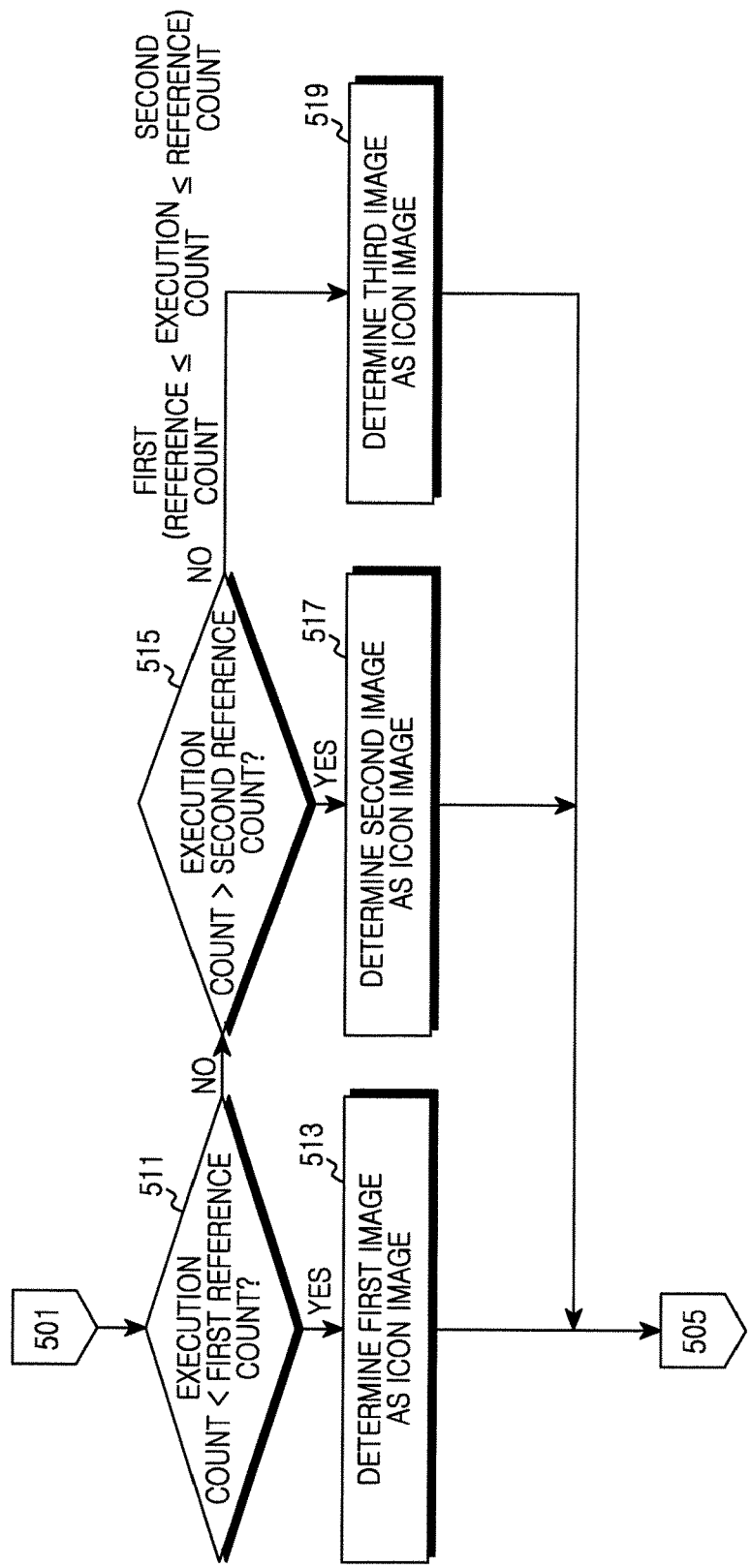

FIGS. 5A and 5B are example flowcharts for determining the icon image based on the application execution count in the electronic device according to this disclosure.

Referring to FIG. 5A, the electronic device determines whether an icon display event occurs in step 501. For example, the electronic device detects the event for displaying an application list including at least one application icon as shown in FIGS. 8A through 8E. The application includes an application installed by an electronic device manufacturer or a user. The application includes a shortcut of a webpage. When the icon display event does not occur, the electronic device finishes this process. For example, the application icon is displayed in a home-screen or an app drawer of Android. That is, the electronic device determines whether the home-screen or app drawer display event occurs.

When the icon display event occurs, the electronic device determines the icon image corresponding to the execution count in step 503. In so doing, the electronic device considers the execution count during the reference period. For example, the electronic device determines at least one of the application images as the icon image according to the application execution count (frequency). In so doing, the application is assumed to include a plurality of images available for the icon image. Additionally, the electronic device uses the icon image by changing the color, the brightness, the saturation, or the size of the image.

In step 505, the electronic device displays the icon image. For example, the electronic device displays the image determined based on the application execution count, as the icon image as shown in FIGS. 8A through 8E.

Referring now to FIG. 5B, when the icon display event occurs in step 501 of FIG. 5A, the electronic device determines whether the application execution count is smaller than a first reference count in step 511.

Figure 5C:
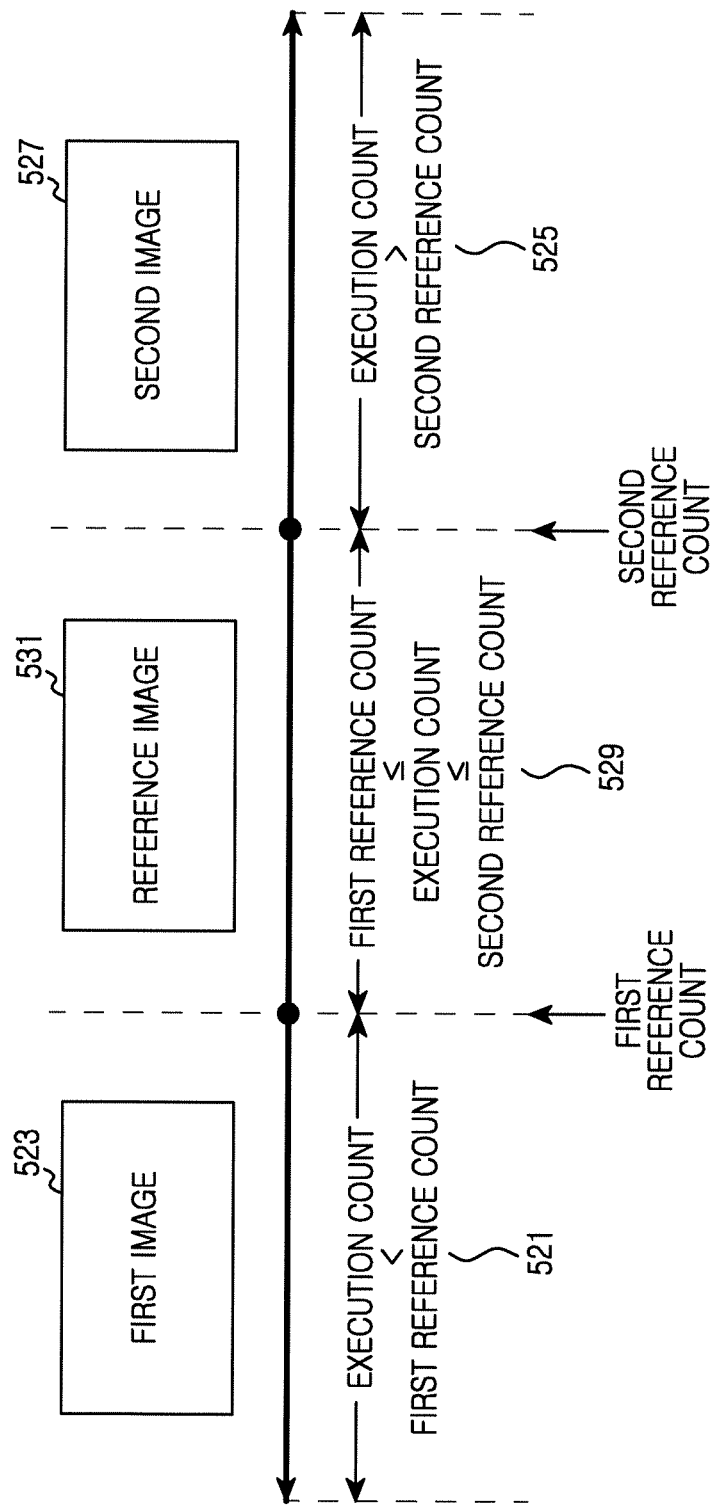
FIG. 5C is a diagram of an example screen for determining the icon image based on the application execution count in the electronic device according to this disclosure.

When the application execution count is smaller than the first reference count, the electronic device determines a first image as the icon image in step 513. For example, when the application execution count is smaller than the first reference count in step 521 as shown in FIG. 5C, the electronic device determines the first image 523 as the icon image.

By contrast, when the application execution count is not smaller than the first reference count, the electronic device determines whether the execution count is greater than a second reference count in step 515.

When the application execution count is greater than a second reference count, the electronic device determines a second image as the icon image in step 517. For example, when the application execution count is greater than the second reference count in step 525 as shown in FIG. 5C, the electronic device determines the second image 527 as the icon image.

By contrast, when the application execution count is not greater than the second reference count, the electronic device recognizes that the execution count is greater than or equal to the first reference count and smaller than or equal to the second reference count and thus determine a reference image as the icon image in step 519. For example, when the application execution count is greater than or equal to the first reference count and smaller than or equal to the second reference count in step 529 as shown in FIG. 5C, the electronic device determines the reference image 531 as the icon image.

For example, when the first reference count is 10, the second reference count is 20, and the execution count is 5, the electronic device determines the first image as the icon image. When the execution count is 25, the electronic device determines the second image as the icon image. When the execution count is 15, the electronic device determines the reference image as the icon image.

In step 505 of FIG. 5A, the electronic device displays the determined icon image.

Figure 6A:
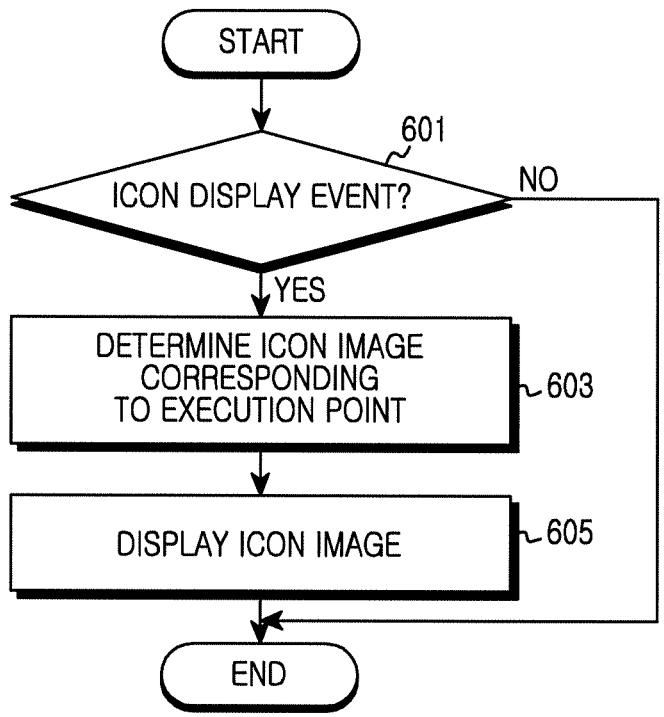
FIGS. 6A and 6B are example flowcharts for determining the icon image based on an application execution point in the electronic device according to this disclosure.
Figure 6B:
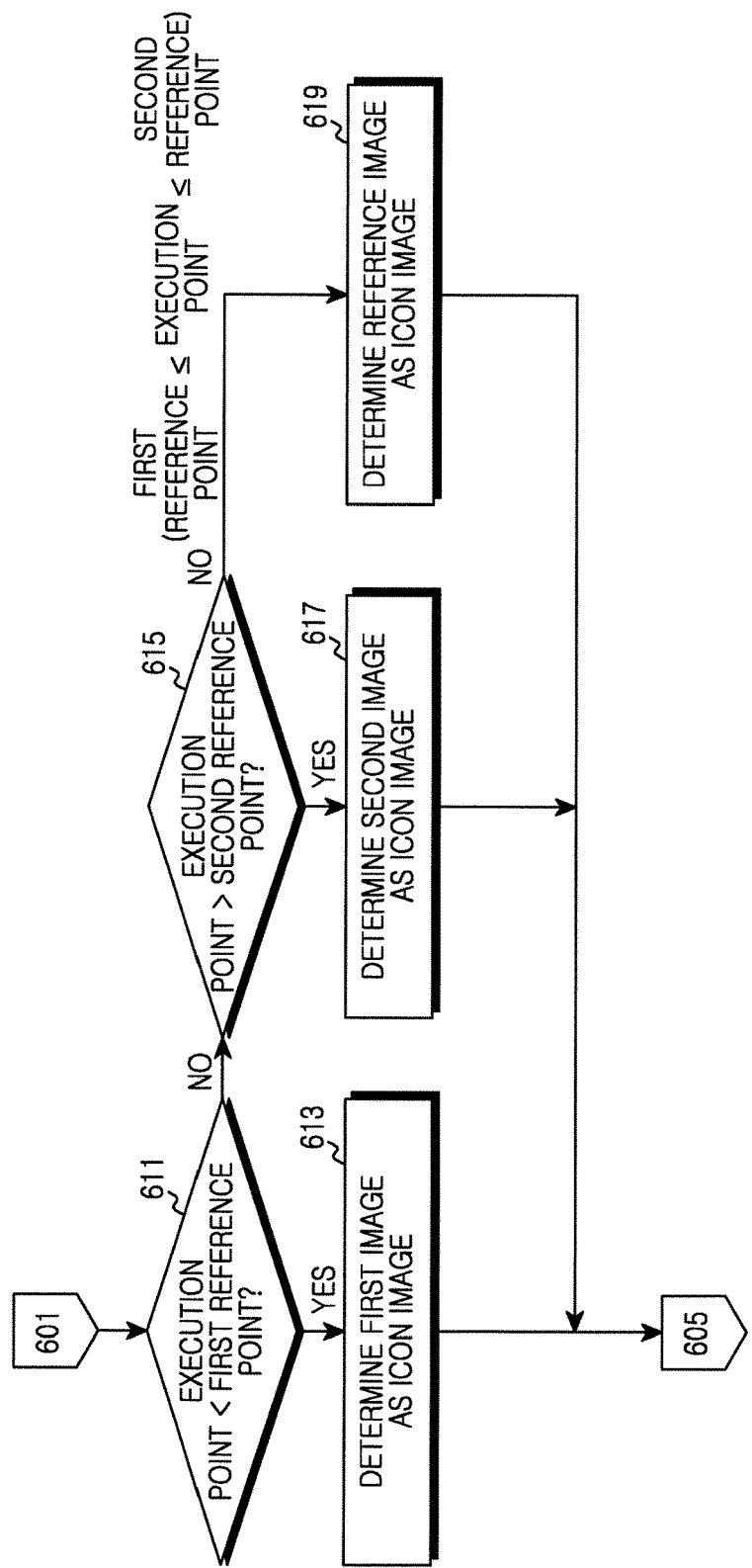

FIGS. 6A and 6B are example flowcharts for determining the icon image based on the application execution point in the electronic device according to this disclosure.

Referring to FIG. 6A, the electronic device determines whether the icon display event occurs in step 601. For example, the electronic device detects the event for displaying the application list including at least one application icon as shown in FIGS. 8A through 8E. The application includes the application installed by the electronic device manufacturer or the user. The application includes the shortcut of the webpage. When the icon display event does not occur, the electronic device finishes this process. For example, the application icon is displayed in the home-screen or the app drawer of Android. That is, the electronic device determines whether the home-screen or app drawer display event occurs.

When the icon display event occurs, the electronic device determines the icon image corresponding to the execution point in step 603. In so doing, the electronic device considers the execution point during the reference period. For example, the electronic device determines at least one of the images of the application, corresponding to the execution point, as the icon image. In so doing, the application is assumed to include the plurality of images available for the icon image. Additionally, the electronic device uses the icon image by changing the color, the brightness, the saturation, or the size of the image.

In step 605, the electronic device displays the icon image. For example, the electronic device displays the image determined based on the application execution point, as the icon image as shown in FIGS. 8A through 8E.

Referring now to FIG. 6B, when the icon display event occurs in step 601 of FIG. 6A, the electronic device determines whether the application execution point is ahead of a first reference point in step 611. That is, the electronic device determines whether the point of the last application execution is far ahead of the first reference point.

Figure 6C:
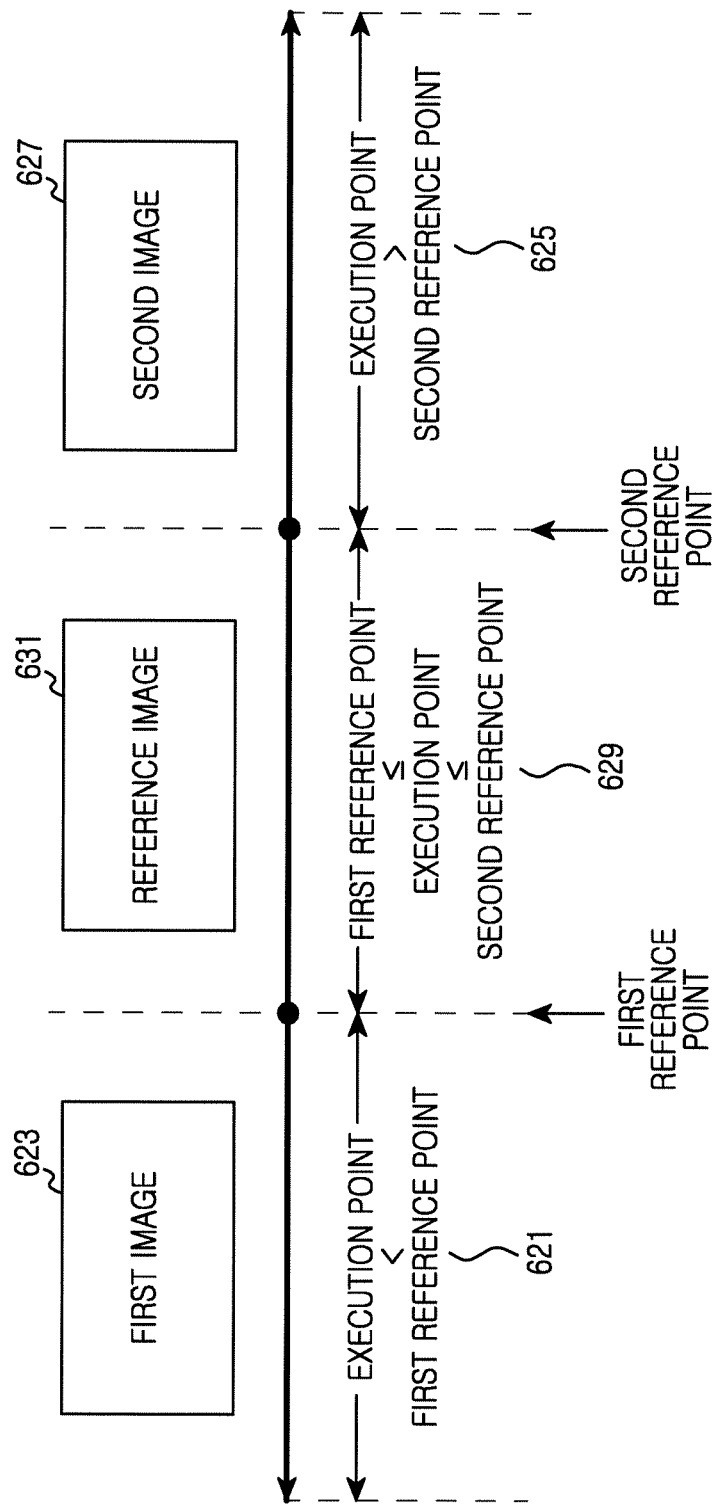
FIG. 6C is a diagram of an example screen for determining the icon image based on the application execution point in the electronic device according to this disclosure.

When the application execution point is ahead of the first reference point, the electronic device determines the first image as the icon image in step 613. For example, when the application execution point is ahead of the first reference point in step 621 as shown in FIG. 6C, the electronic device determines the first image 623 as the icon image.

By contrast, when the application execution point is not ahead of the first reference point, the electronic device determines whether the execution point is behind a second reference point in step 615.

When the application execution point is behind the second reference point, the electronic device determines the second image as the icon image in step 617. For example, when the application execution point is behind the second reference point in step 625 as shown in FIG. 6C, the electronic device determines the second image 627 as the icon image.

By contrast, when the application execution point is not behind the second reference point, the electronic device recognizes that the execution point is behind the first reference point or ahead of the second reference point and thus determine the reference image as the icon image in step 619. For example, when the application execution point is behind the first reference point or ahead of the second reference point in step 629 as shown in FIG. 6C, the electronic device determines the reference image 631 as the icon image.

For example, when the first reference point is 10 days ago, the second reference point is 5 days ago, and the execution point is 15 days ago, the electronic device determines the first image as the icon image. When the execution point is 3 days ago, the electronic device determines the second image as the icon image. When the execution point is 7 days ago, the electronic device determines the reference image as the icon image.

In step 605 of FIG. 6A, the electronic device displays the icon image.

Figure 7A:
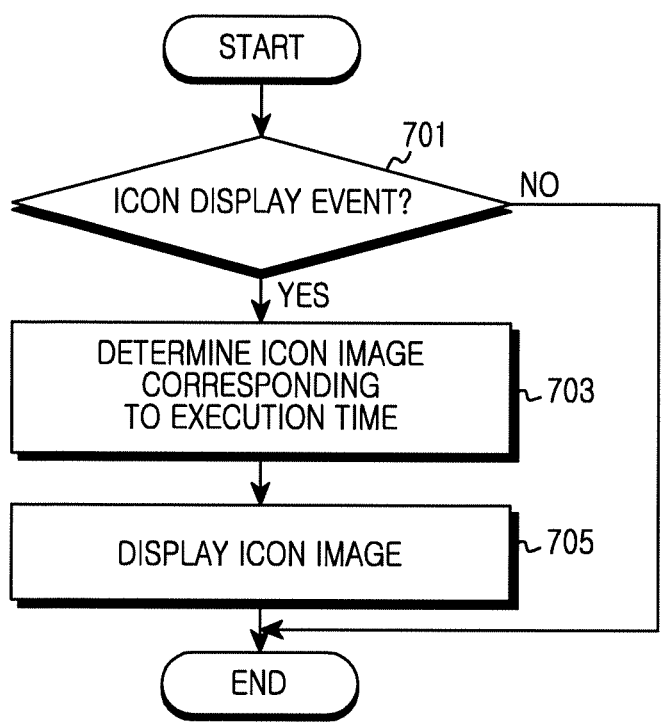
FIGS. 7A and 7B are example flowcharts for determining the icon image based on an application execution time in the electronic device according to this disclosure.
Figure 7B:
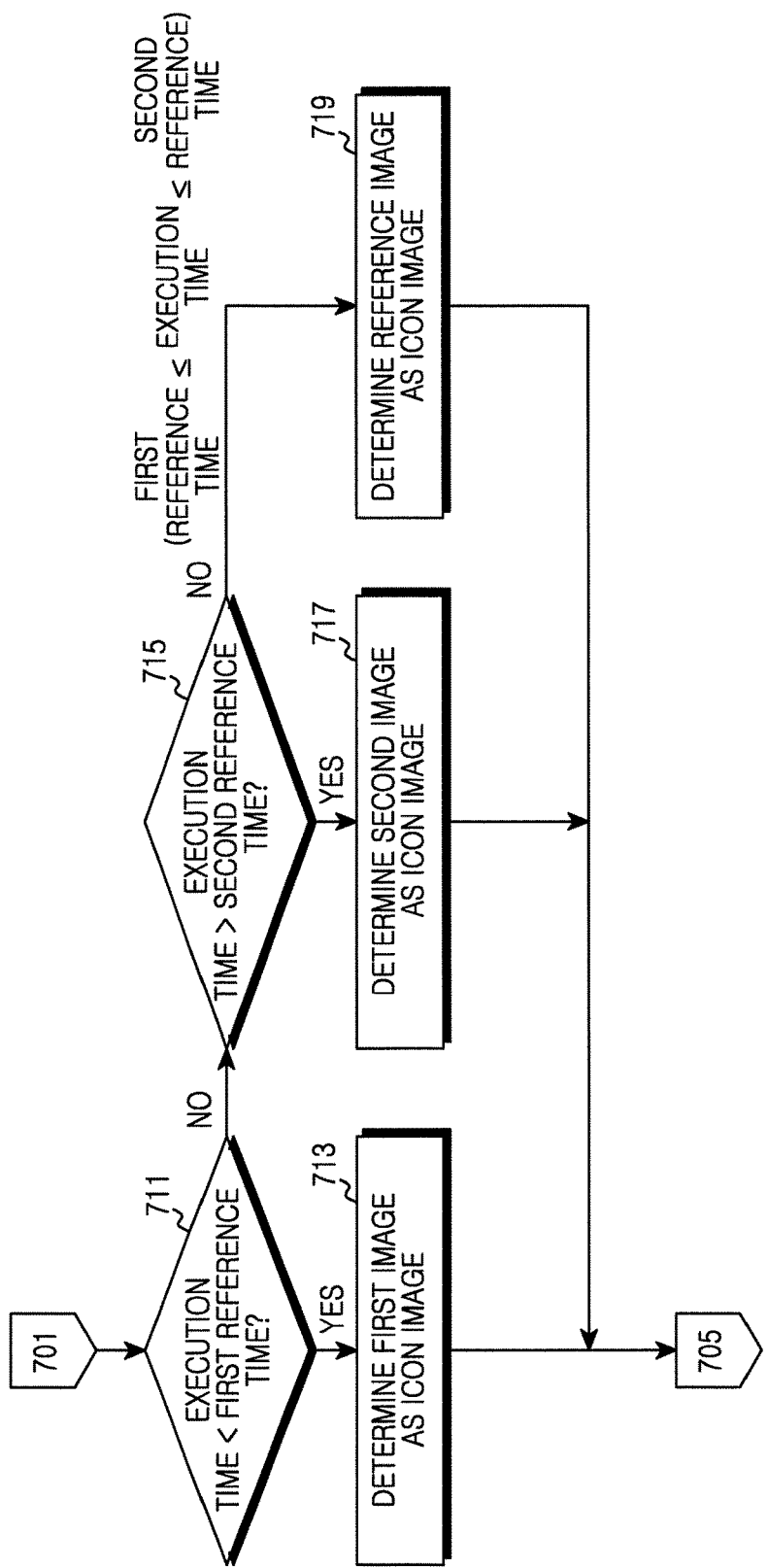

FIGS. 7A and 7B are example flowcharts for determining the icon image based on the application execution time in the electronic device according to this disclosure.

Referring to FIG. 7A, the electronic device determines whether the icon display event occurs in step 701. For example, the electronic device detects the event for displaying the application list including at least one application icon as shown in FIGS. 8A through 8E. The application includes the application installed by the electronic device manufacturer or the user. The application includes the shortcut of the webpage. When the icon display event does not occur, the electronic device finishes this process. For example, the application icon is displayed in the home-screen or the app drawer of Android. That is, the electronic device determines whether the home-screen or app drawer display event occurs.

When the icon display event occurs, the electronic device determines the icon image based on the application execution time in step 703. For example, the electronic device determines at least one of the images of the application as the icon image based on the application execution time. In so doing, the electronic device determines the icon image based on the application execution time during the reference period. Herein, the application is assumed to include the plurality of images available for the icon image. Additionally, the electronic device uses the icon image by changing the color, the brightness, the saturation, or the size of the image.

In step 705, the electronic device displays the determined icon image. For example, the electronic device displays the image determined based on the application execution time, as the icon image as shown in FIGS. 8A through 8E.

Referring now to FIG. 7B, when the icon display event, the electronic device compare the application execution time and the first reference time in step 711.

Figure 7C:
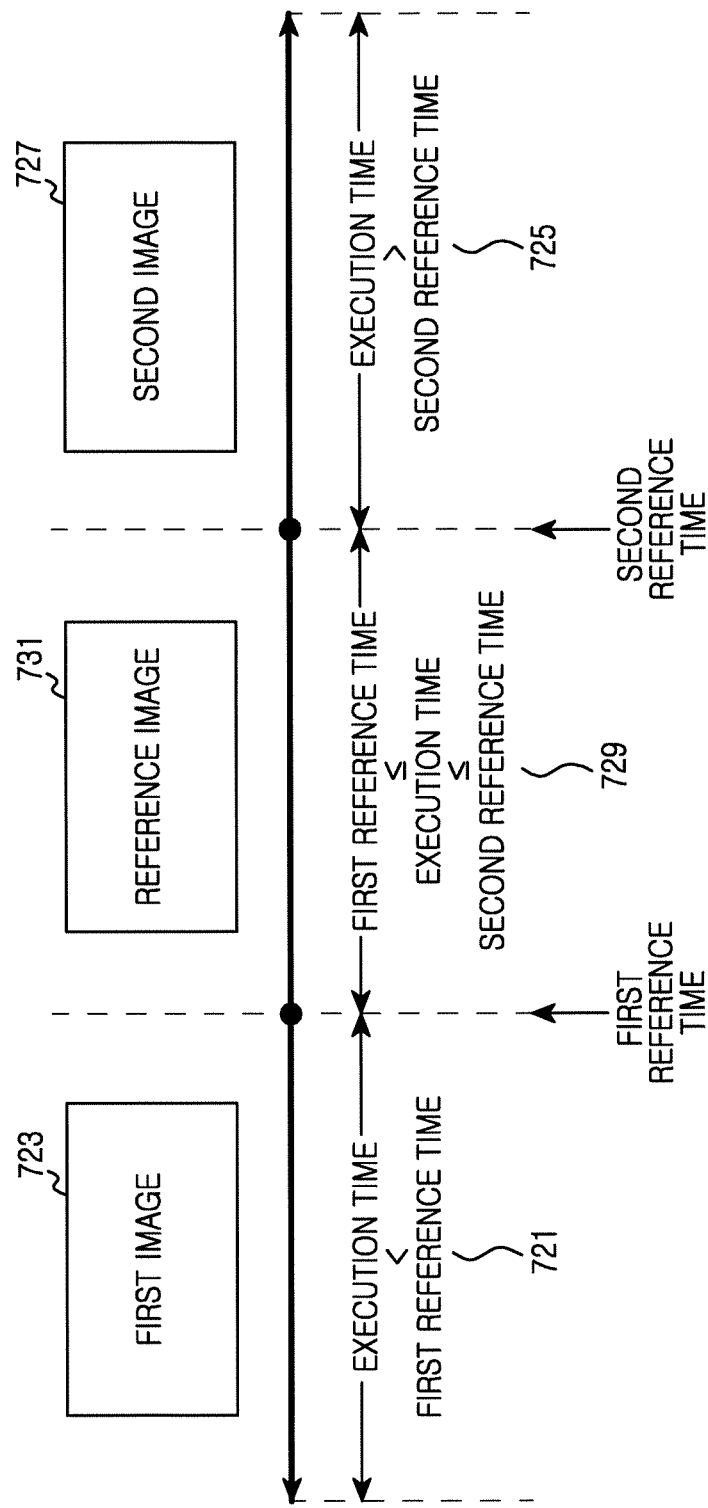
FIG. 7C is a diagram of an example screen for determining the icon image based on the application execution time in the electronic device according to this disclosure.

When the application execution time is shorter than the first reference time, the electronic device determines the first image as the icon image in step 713. For example, when the application execution time is shorter than the first reference time in step 721 as shown in FIG. 7C, the electronic device determines the first image 723 as the icon image.

By contrast, when the application execution time is longer than the first reference time, the electronic device compares the application execution time and the second reference time in step 715.

When the application execution time is longer than the second reference time, the electronic device determines second first image as the icon image in step 717. For example, when the application execution time is longer than the second reference time in step 725 as shown in FIG. 7C, the electronic device determines the second image 727 as the icon image.

By contrast, when the application execution time is shorter than the second reference time, the electronic device recognizes that the application execution time is longer than the first reference point and shorter than the second reference time and thus determines the reference image as the icon image in step 719. For example, when the application execution time is longer than the first reference point and shorter than the second reference time in step 729 as shown in FIG. 7C, the electronic device determines the reference image 731 as the icon image.

For example, when the first reference time is 1 hour, the second reference second is 2 hours, and the application execution time is 30 minutes, the electronic device determines the first image as the icon image. When the application execution time is 3 hours, the electronic device determines the second image as the icon image. When the application execution time is one and a half hours, the electronic device determines the reference image as the icon image.

Figure 8A:
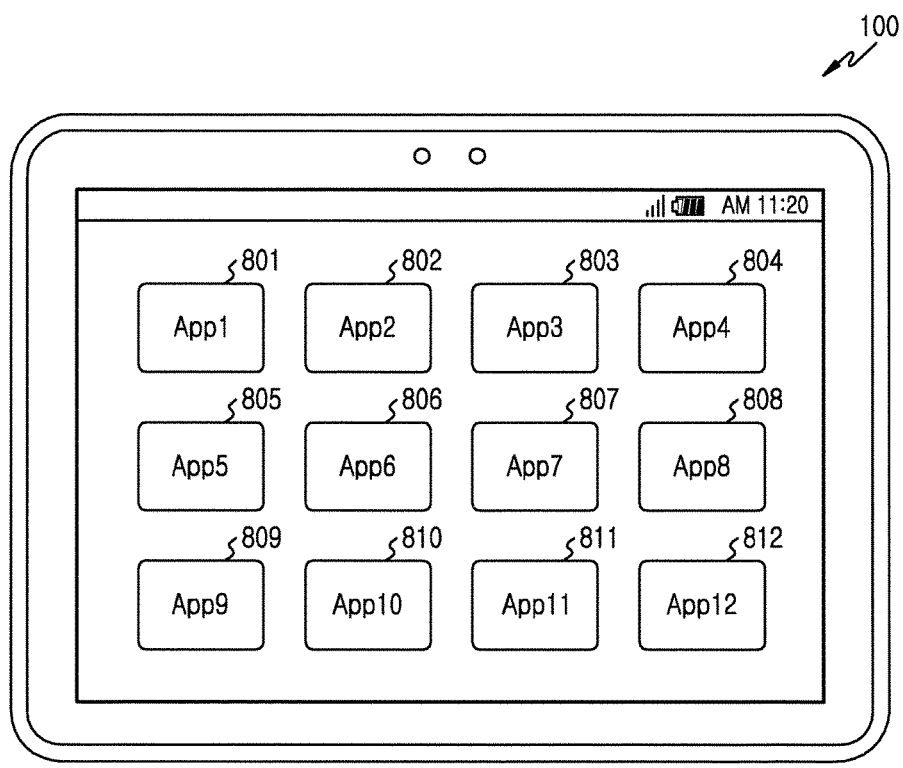
FIGS. 8A, 8B, and 8C are diagrams of example screens for determining the application icon image based on the application execution information in the electronic device according to this disclosure.

Referring to FIG. 8A, the electronic device displays icons of an App1 801 through an App12 812.

Figure 8B:
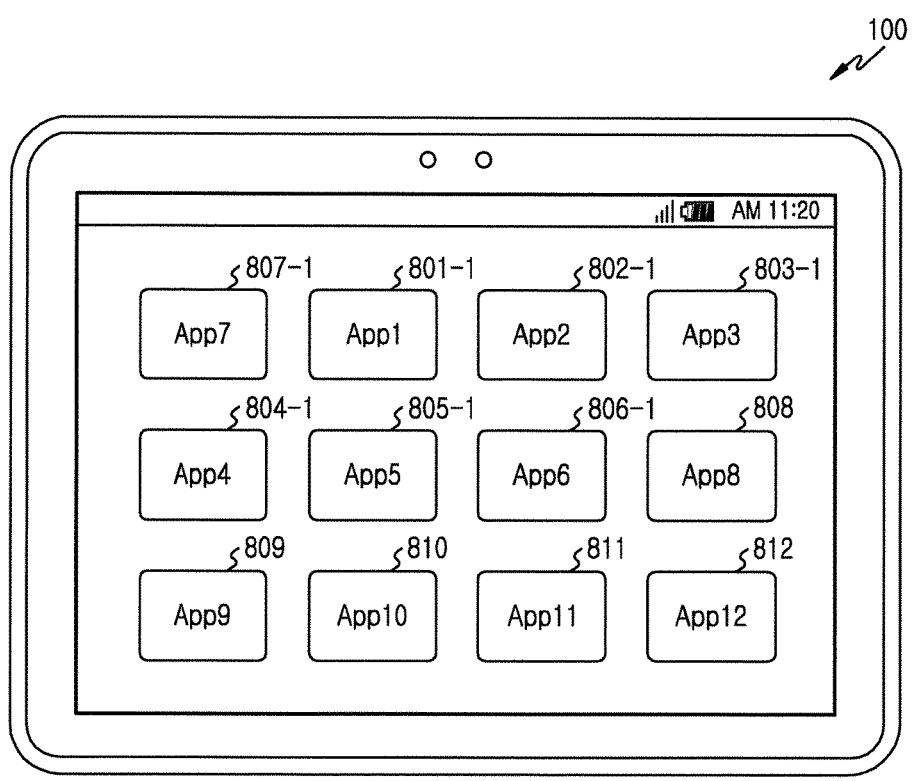

The electronic device determines the icon location of the application by considering the application execution information. For example, when the execution count of the App7 807 is the greatest in FIG. 8A, the electronic device moves and displays the icon of the App7 807-1 as shown in FIG. 8B. For example, when the execution point of the App7 807 is the latest in FIG. 8A, the electronic device move and displays the icon of the App7 807-1 as shown in FIG. 8B. For example, when the execution time of the App7 807 is the longest in FIG. 8A, the electronic device move and displays the icon of the App7 807-1 as shown in FIG. 8B. In so doing, the electronic device move and displays the icons of the App1 801-1 through the App6 806-1 of FIG. 8A as shown in FIG. 8B.

Figure 8C:
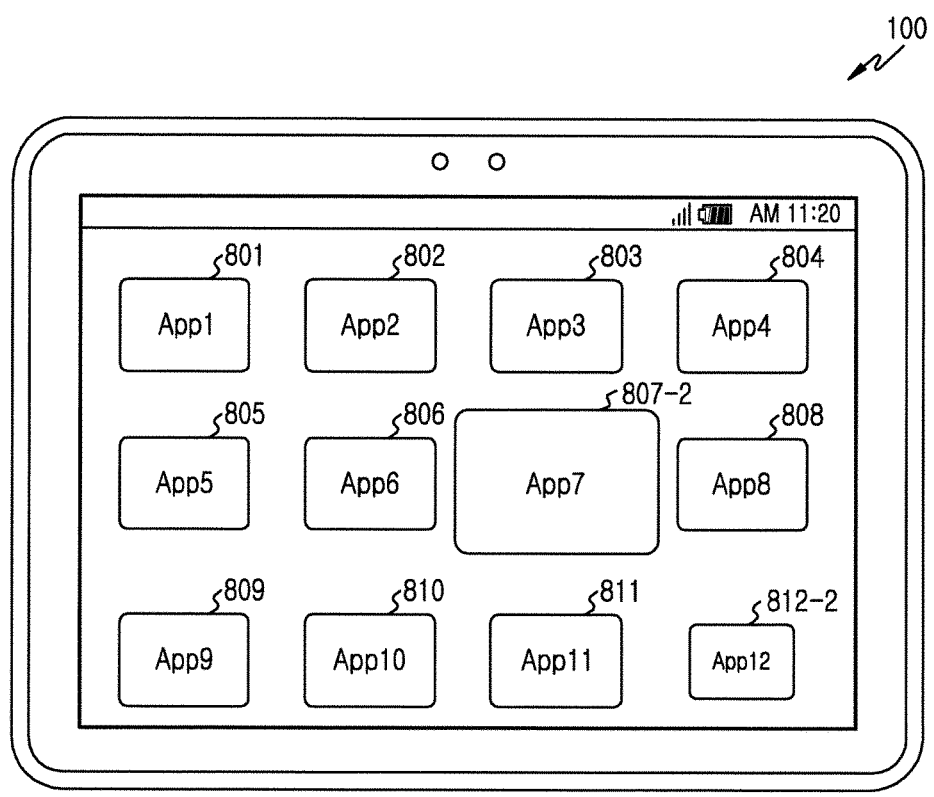

The electronic device determines an icon area of the application by considering the application execution information. For example, when the execution count of the App7 807 is the greatest in FIG. 8A, the electronic device changes and displays the icon area of the App7 807-2 as shown in FIG. 8C. For example, when the execution count of the App12 812 is the smallest in FIG. 8A, the electronic device changes and displays the icon area of the App12 812-2 as shown in FIG. 8C. For example, when the execution point of the App7 807 is the latest in FIG. 8A, the electronic device changes and displays the icon area of the App7 807-2 as shown in FIG. 8C. For example, when the execution point of the App 12 812 is the oldest in FIG. 8A, the electronic device changes and displays the icon area of the App12 812-2 as shown in FIG. 8C. For example, when the execution time of the App7 807 is the longest in FIG. 8A, the electronic device changes and displays the icon area of the App7 807-2 as shown in FIG. 8C. For example, when the execution time of the App 12 812 is the shortest in FIG. 8A, the electronic device changes and displays the icon area of the App12 812-2 as shown in FIG. 8C.

Figure 8D:
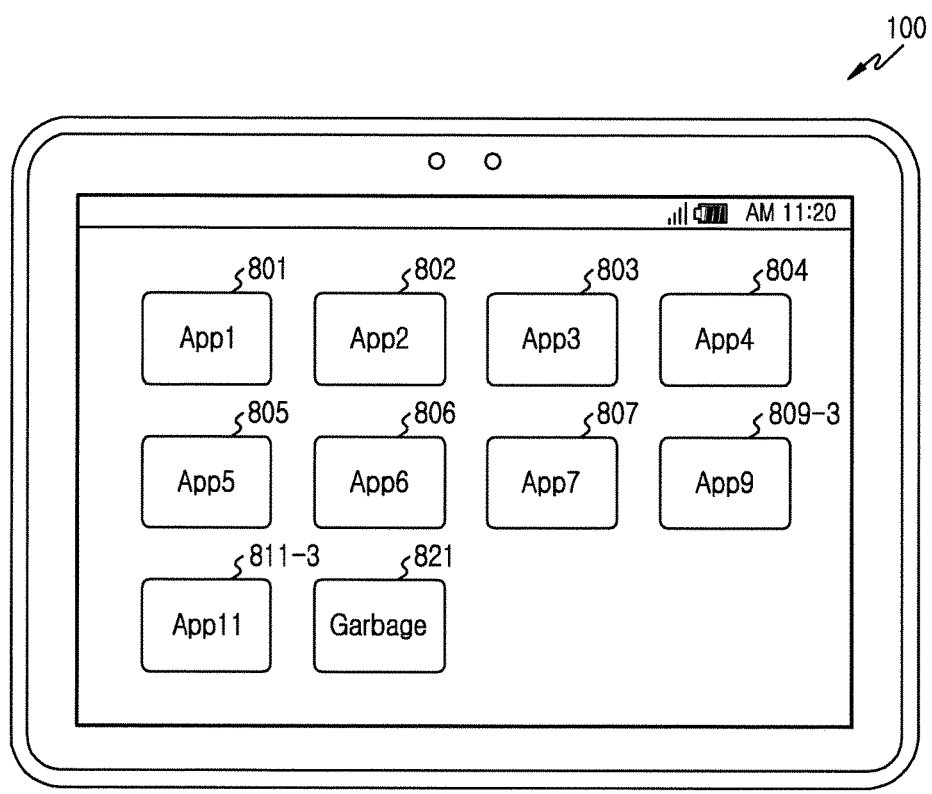
FIG. 8D is a diagram of an example screen for adding an application infrequently used into a particular folder based on the application execution information in the electronic device according to this disclosure.

The electronic device moves the application icon to a particular folder by considering the application execution information. In so doing, the electronic device moves the application icon to the particular folder by considering whether the application is preloaded or paid. For example, when the execution count of the App8 808, the App10 810, and the App12 812 is smaller than the reference execution count in FIG. 8A, the electronic device generates a Garbage folder 821 and put the icons of the App8 808, the App10 810, and the App12 812 into the Garbage folder 821 as shown in FIG. 8D. For example, when the execution point of the App8 808, the App10 810, and the App12 812 is ahead of the reference execution point in FIG. 8A, the electronic device generates the Garbage folder 821 and put the icons of the App8 808, the App10 810, and the App12 812 into the Garbage folder 821 as shown in FIG. 8D. For example, when the execution time of the App8 808, the App10 810, and the App12 812 is shorter than the reference execution time in FIG. 8A, the electronic device generates the Garbage folder 821 and put the icons of the App8 808, the App10 810, and the App12 812 into the Garbage folder 821 as shown in FIG. 8D. In so doing, the electronic device moves and displays the icons of the App9 809-3 through the App11 811-3 of FIG. 8A as shown in FIG. 8D.

Figure 8E:
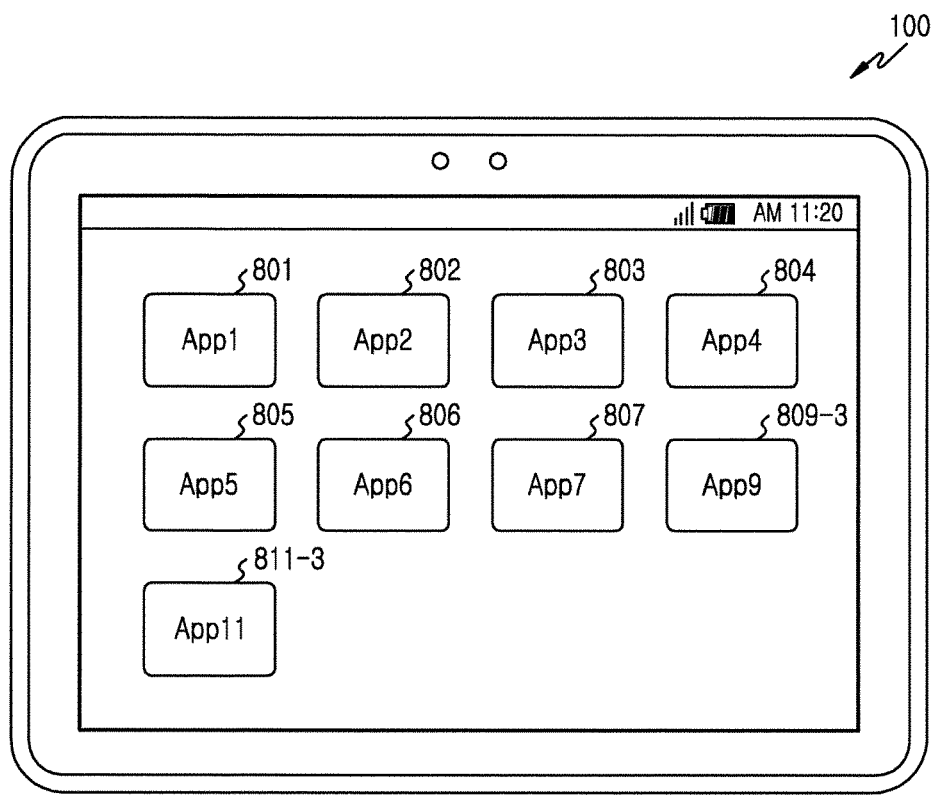
FIG. 8E is a diagram of an example screen for deleting the application infrequently used based on the application execution information in the electronic device according to this disclosure.

The electronic device deletes the application by considering the application execution information. In so doing, the electronic device determines whether to delete the application by considering whether the application is preloaded or paid. For example, when the execution count of the App8 808, the App10 810, and the App12 812 is smaller than the reference execution count in FIG. 8A, the electronic device deletes the App8 808, the App10 810, and the App12 812 as shown in FIG. 8E. For example, when the execution point of the App8 808, the App10 810, and the App12 812 is ahead of the reference execution point in FIG. 8A, the electronic device deletes the App8 808, the App10 810, and the App12 812 as shown in FIG. 8E. For example, when the execution time of the App8 808, the App10 810, and the App12 812 is shorter than the reference execution time in FIG. 8A, the electronic device deletes the App8 808, the App10 810, and the App12 812 as shown in FIG. 8E. In so doing, by moving App9 809 and App11 811 of FIG. 8A, the electronic device displays the icons of the App9 809-3 and the App11 811-3 as shown in FIG. 8D.

As above, the electronic device determines and displays one of the icons as the application icon based on the application execution information.

In so doing, it is necessary to allow an application developer to include the plurality of the application icons and the condition for determining the icon to display based on the application execution information, in the application installation file (such as package).

Figure 9:
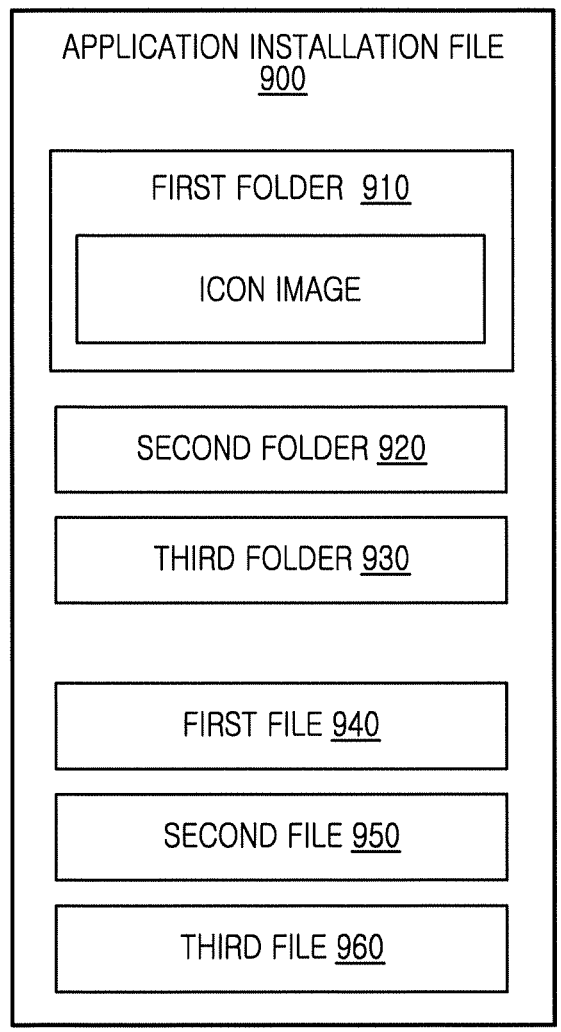
FIG. 9 is a diagram of an application package for determining the icon image based on the application execution information in the electronic device according to this disclosure.

For example, referring to FIG. 9, an application installation file 900 includes one or more folders including a first folder 910, a second folder 920, and a third folder 930, and one or more files including a first file 940, a second file 950, and a third file 960. Herein, the application installation file 900 is an Android application package (APK) file.

The first folder 910 contains internal resource data of the application or a software program. For example, the first folder 910 is a "res" folder including the Android APK file. The icon images is contained in the "res" folder or a subfolder of the "res" folder.

As above, the icon images is contained in the first folder 910 of the application installation file 900 by way of example. The icon images is in other folder or at a different location of the application installation file 900.

The second folder 920 contains meta information data of the application. Herein, the meta information data of the application includes digital signature data of the user in a certificate when the application is distributed. For example, the second folder 920 is a "META-INF" folder of the Android APK file.

The third folder 930 contains external resource data of the application or other application installation file. For example, the third folder 930 is an "asset" folder of the Android APK file.

The first file 940 stores default information of the application, and is referenced to first among a plurality of files of the applications. For example, the first file 940 is an Android "AndroidManifest.xml" file. Storage paths of the icon images is contained in the first file 940. The storage paths of the icon images includes storage paths of the icons images stored in the memory, or storage paths (such as URL) of the icon images uploaded to the server.

The second file 950 is generated by compiling the source code of the application, and includes class information of the application. For example, the second file 950 is an Android "classes.dex" file.

The third file 960 includes resources compiled before the application execution. For example, the third file 960 is an Android "resources.arsc" file.

As above, the electronic device determines the icon image based on the execution count, the execution point, and the execution time of the application.

Figure 10:
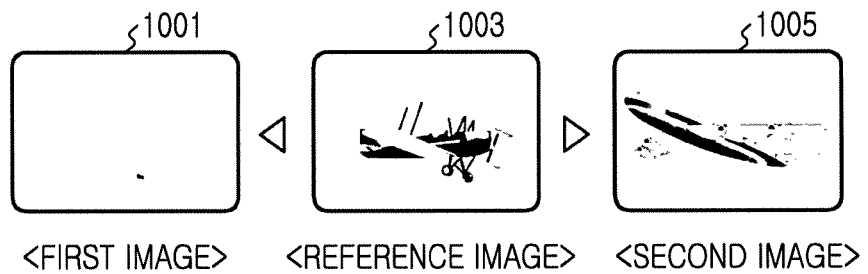
FIG. 10 is a diagram of an example screen for determining the icon image based on the application execution information in the electronic device according to this disclosure.

Referring to FIG. 10, to determine the icon image based on the execution count, when the first reference count is 10, the second reference count 20, and the execution count is 5, the electronic device determines a first image 1001 as the icon image as shown in FIG. 10. When the execution count is 25, the electronic device determines a second image 1005 as the icon image. When the execution count is 15, the electronic device determines a reference image 1003 as the icon image.

Referring to FIG. 10, to determine the icon image based on the execution point, when the first reference point is 10 days ago, the second reference point is 5 days ago, and the execution point is 15 days ago, the electronic device determines the first image 1001 as the icon image. When the execution point is 3 days ago, the electronic device determines the second image 1005 as the icon image. When the execution point is 7 days ago, the electronic device determines the reference image 1003 as the icon image.

Referring to FIG. 10, to determine the icon image based on the execution time, when the first reference time is 1 hour, the second reference second is 2 hours, and the application execution time is 30 minutes, the electronic device determines the first image 1001 as the icon image. When the application execution time is 3 hours, the electronic device determines the second image 1005 as the icon image. When the application execution time is one and a half hours, the electronic device determines the reference image 1003 as the icon image.

As such, the electronic device determines the icon display location based on the application execution information (such as at least one of the execution count, the execution point, and the execution time).

Figure 11A:
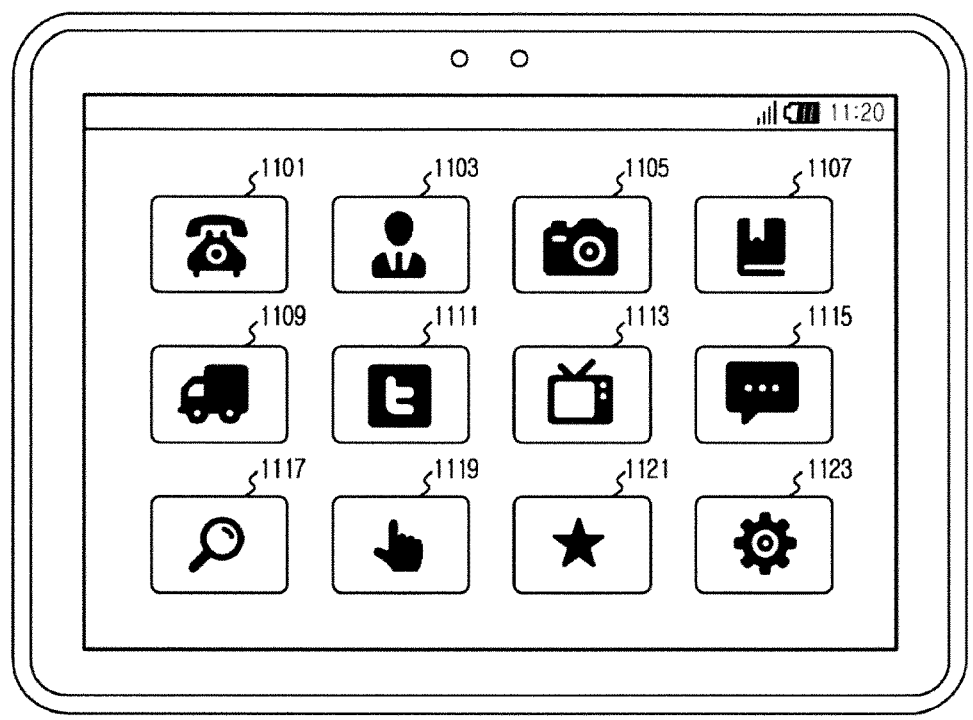
FIGS. 11A, 11B, 11C and 11D are diagrams of example screens for altering a display type, an area, and a location of the icon image based on the application execution information in the electronic device according to this disclosure.
Figure 11B:
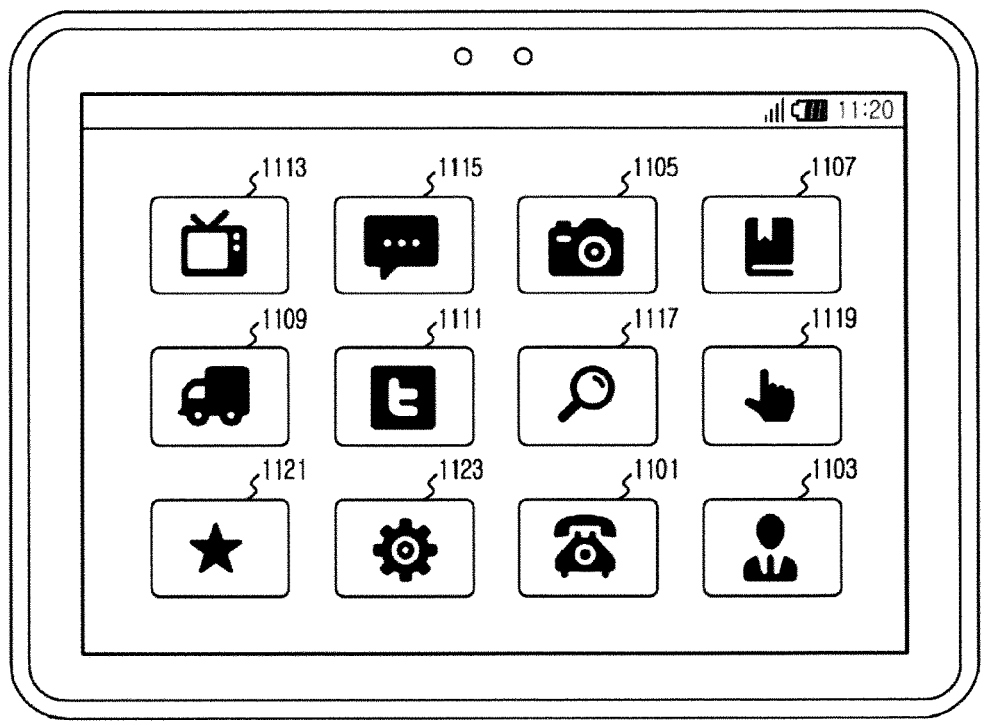

For example, the electronic device determines the icon display location based on the execution count of a first application 1101 through a twelfth application 1123 as shown in FIG. 11A. More specifically, when the execution count of the seventh application 1113 is the greatest, the electronic device moves and displays the icon of the seventh application 1113 as shown in FIG. 11B. By contrast, when the execution count of the second application 1103 is the smallest, the electronic device moves and displays the icon of the second application 1103 of FIG. 11A as shown in FIG. 11B. In so doing, the electronic device operates the same based on the execution point and the execution time.

The electronic device determines the icon display area based on the application execution information (such as at least one of the execution count, the execution point, and the execution time).

Figure 11C:
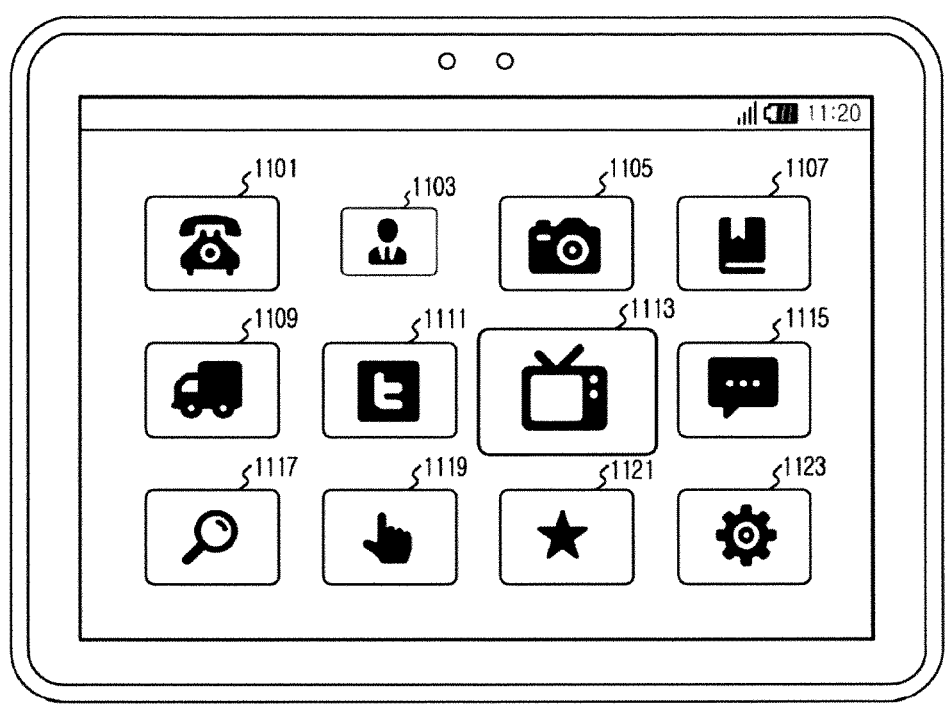

For example, the electronic device determines the icon display area based on the execution count of the first application 1101 through the twelfth application 1123 as shown in FIG. 11A. More specifically, when the execution count of the seventh application 1113 is the greatest, the electronic device magnifies the icon of the seventh application 1113 as shown in FIG. 11C. By contrast, when the execution count of the second application 1103 is the smallest, the electronic device demagnifies the icon of the second application 1103 of FIG. 11A as shown in FIG. 11C. In so doing, the electronic device operates the same based on the execution point and the execution time.

The electronic device deletes the icon or the application based on the application execution information (such as at least one of the execution count, the execution point, and the execution time).

Figure 11D:
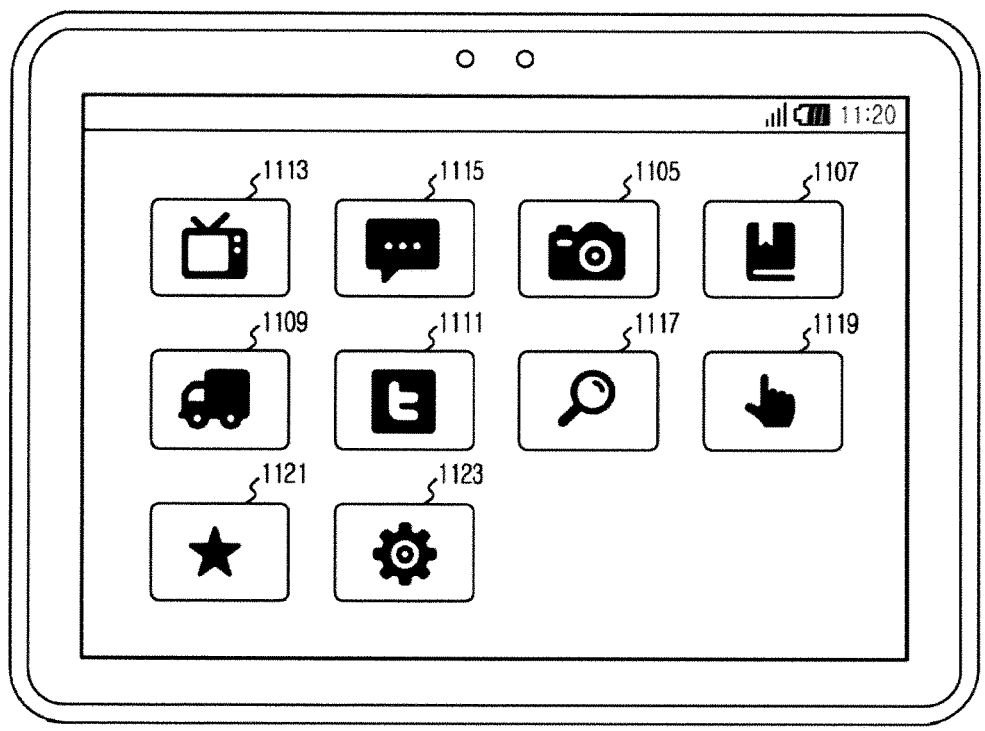

For example, the electronic device deletes the icon or the application based on the execution count of the first application 1101 through the twelfth application 1123 as shown in FIG. 11A. More specifically, when the execution count of the first application 1101 and the second application 1103 is smaller than the reference execution count, the electronic device hides the icon of the first application 1101 and the second application 1103 as shown in FIG. 11D. Also, the electronic device deletes the first application 1101 and the second application 1103. In so doing, the electronic device operates the same based on the execution point and the execution time. In addition, the electronic device moves the application icon to a particular folder by considering the application execution information.

As such, the electronic device changes the application icon image and the location of the icon image according to the application execution information. Thus, the electronic device user easily perceives and utilizes the application frequently used.

While the disclosure has been shown and described with reference to certain exemplary embodiments thereof, it will be understood by those skilled in the art that various changes in form and details is made therein without departing from the spirit and scope of the disclosure as defined by the appended claims and their equivalents.

What is claimed is:

1. A method for configuring a user interface in an electronic device, comprising:
   receiving an icon display event;
   in response to receiving the icon display event, determining, based on application execution information of a plurality of icons and whether an application corresponding to each of a plurality of icons is an application which has been installed by a manufacturer of the electronic device, an icon to be deleted among the plurality of icons;
   in response to determining the icon, deleting the determined icon;
   and
   displaying at least one remaining icon among the plurality of icons,
   wherein the application execution information comprises at least one of an execution count, an execution time, and an execution point of an application during a reference time.

2. The method of claim 1, wherein the plurality of the icons comprises at least one different characteristic of a color, a brightness, a saturation, an area, and a shape.

3. The method of claim 1, wherein the displaying comprises:
   displaying the at least one remaining icon using a storage path of the icon stored in a memory of the electronic device.

4. The method of claim 1, wherein the displaying comprises:
   displaying the at least one remaining icon using a uniform resource locator (URL) of the at least one remaining icon stored in a server accessible by the electronic device.

5. An electronic device comprising:
   one or more memories;
   one or more displays; and
   one or more processors configured to:
   receive an icon display event;
   in response to receiving the icon display event, determine, based on application execution information of a plurality of icons and whether an application corresponding to each of a plurality of icons is an application which has been installed by a manufacturer of the electronic device, an icon to be deleted among the plurality of icons;

delete the determined icon; and control the one or more displays to display at least one remaining icon among the plurality of icons, wherein the application execution information comprises at least one of an execution count, an execution time, and an execution point of an application during a reference time.

6. The electronic device of claim 5, wherein the plurality of the icons comprises at least one different characteristic of a color, a brightness, a saturation, an area, and a shape.

7. The electronic device of claim 5, wherein the processor is configured to control to display the at least one remaining icon on the display using a storage path of the icon stored in a memory.

8. The electronic device of claim 5, wherein the processor is configured to control to display the at least one remaining icon on the display using a uniform resource locator (URL) of the at least one remaining icon stored in a server accessible by the electronic device.

9. The method of claim 1, wherein the electronic device comprises at least one of a smart phone, a tablet personal computer (PC), a mobile phone, a video phone, an e-book reader, a desktop PC, a laptop PC, a net book computer, a personal digital assistant (PDA), a portable multimedia player (PMP), an MP3 player, a mobile medical appliance, an electronic bracelet, an electronic necklace, an electronic accessory, a camera, a wearable device, an electronic clock, a wrist watch, and a smart white appliance.

10. The method of claim 1, wherein the electronic device comprises at least one of a medical appliance, a navigation device, a global positioning system (GPS) receiver, an event data recorder (EDR), a flight data recorder (FDR), a set-top box, a TV box, an electronic dictionary, an in-vehicle infotainment, electronic equipment for a ship, avionics, a security device, an e-textile, a digital key, a camcorder, a game console, a head mounted display (HMD), a flat panel display device, an electronic album, an electronic board, an electronic sign input device, and a projector.

11. The electronic device of claim 5, wherein the electronic device comprises at least one of a smart phone, a tablet personal computer (PC), a mobile phone, a video phone, an e-book reader, a desktop PC, a laptop PC, a net book computer, a personal digital assistant (PDA), a portable multimedia player (PMP), an MP3 player, a mobile medical appliance, an electronic bracelet, an electronic necklace, an electronic accessory, a camera, a wearable device, an electronic clock, a wrist watch, and a smart white appliance.

12. The electronic device of claim 5, wherein the electronic device comprises at least one of a medical appliance, a navigation device, a global positioning system (GPS) receiver, an event data recorder (EDR), a flight data recorder (FDR), a set-top box, a TV box, an electronic dictionary, an in-vehicle infotainment, electronic equipment for a ship, avionics, a security device, an e-textile, a digital key, a camcorder, a game console, a head mounted display (HMD), a flat panel display device, an electronic album, an electronic board, an electronic sign input device, and a projector.

* * * * *